(12) United States Patent
Sosnin et al.

(10) Patent No.: US 12,432,737 B2
(45) Date of Patent: Sep. 30, 2025

(54) TRANSMISSION SCHEME FOR PHYSICAL UPLINK CONTROL CHANNEL

(71) Applicant: Intel Corporation, Santa Clara, CA (US)

(72) Inventors: Sergey Sosnin, Zavolzhie (RU); Jie Zhu, San Jose, CA (US); Gang Xiong, Portland, OR (US); Seunghee Han, San Jose, CA (US); Gregory Ermolaev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 407 days.

(21) Appl. No.: 17/926,089

(22) PCT Filed: Jun. 25, 2021

(86) PCT No.: PCT/US2021/039117
§ 371 (c)(1),
(2) Date: Nov. 17, 2022

(87) PCT Pub. No.: WO2022/026093
PCT Pub. Date: Feb. 3, 2022

(65) Prior Publication Data
US 2023/0209555 A1 Jun. 29, 2023

Related U.S. Application Data

(60) Provisional application No. 63/091,659, filed on Oct. 14, 2020, provisional application No. 63/088,885, (Continued)

(51) Int. Cl.
*H04W 72/21* (2023.01)
*H04J 13/00* (2011.01)
*H04W 72/1268* (2023.01)

(52) U.S. Cl.
CPC ......... *H04W 72/21* (2023.01); *H04J 13/0062* (2013.01); *H04W 72/1268* (2013.01)

(58) Field of Classification Search
None
See application file for complete search history.

(56) References Cited

U.S. PATENT DOCUMENTS 10,244,559 B2 * 3/2019 Kim ................... H04W 74/0833
2019/0052422 A1 2/2019 Yin et al.
(Continued)

OTHER PUBLICATIONS

International Search Report and Written Opinion mailed Oct. 19, 2021 for International Patent Application No. PCT/US2021/039117, 13 pages.
(Continued)

*Primary Examiner* — Angela Nguyen
(74) *Attorney, Agent, or Firm* — Eversheds Sutherland (US) LLP

(57) ABSTRACT

Embodiments herein provide techniques for transmission of a physical uplink control channel (PUCCH) in a wireless cellular network. For example, transmission schemes are provided for sequence-based transmission of a PUCCH and/or to improve PUCCH coverage. User equipment (UE) may: determine uplink control information (UCI) pay load information for the PUCCH with a PUCCH format 1; determine a sequence for transmission of the PUCCH based on the UCI pay load information; and map the determined sequence to allocated resources for the PUCCH format 1 for transmission.

17 Claims, 14 Drawing Sheets

Related U.S. Application Data filed on Oct. 7, 2020, provisional application No. 63/083,522, filed on Sep. 25, 2020, provisional application No. 63/059,033, filed on Jul. 30, 2020.

(56) References Cited

U.S. PATENT DOCUMENTS

| | | |
|---|---|---|
| 2019/0124689 A1* | 4/2019 | Yang .................. H04L 5/001 |
| 2020/0146037 A1 | 5/2020 | Park et al. |
| 2020/0236670 A1 | 7/2020 | Xiong et al. |
| 2020/0236700 A1* | 7/2020 | Matsumura .......... H04L 5/0007 |
| 2021/0352656 A1* | 11/2021 | Choi .................... H04W 72/21 |
| 2022/0279559 A1* | 9/2022 | Wong ................ H04W 72/569 |
| 2023/0053253 A1* | 2/2023 | Yeo .................... H04L 5/0055 |

OTHER PUBLICATIONS

3GPP, "TSG RAN; NR; Physical channels and modulation (Release 16)", 3GPP TS 38.211 V16.1.0, Apr. 3, 2020, 131 pages.

3GPP, "5G; NR; Multiplexing and channel coding", (3GPP TS 38.212 version 16.2.0 Release 16), ETSI TS 138 212 V16.2.0, Jul. 2020, 154 pages.

* cited by examiner

1200 determining uplink control information (UCI) payload information for a physical uplink control channel (PUCCH) with a PUCCH format 1
1202 determining a sequence for transmission of the PUCCH based on the UCI payload information
1204 mapping the determined sequence to allocated resources for the PUCCH format 1 for transmission
1206

Figure 12

1300 determining uplink control information (UCI) payload information for a physical uplink control channel (PUCCH) with a PUCCH format 3
1302 initializing a sequence based on some or all of the UCI payload information
1304 encoding the PUCCH for transmission based on the initialized sequence
1306

TRANSMISSION SCHEME FOR PHYSICAL UPLINK CONTROL CHANNEL

CROSS REFERENCE TO RELATED APPLICATIONS

The present application is a national phase entry under 35 U.S.C. § 371 of International Application No. PCT/US2021/039117, filed Jun. 25, 2021, entitled "TRANSMISSION SCHEME FOR PHYSICAL UPLINK CONTROL CHANNEL", which claims priority to U.S. Provisional Patent Application No. 63/059,033, which was filed Jul. 30, 2020; U.S. Provisional Patent Application No. 63/083,522, which was filed Sep. 25, 2020; U.S. Provisional Patent Application No. 63/088,885, which was filed Oct. 7, 2020 and U.S. Provisional Patent Application No. 63/091,659, which was filed Oct. 14, 2020. The applications are hereby incorporated by reference in their entireties for all purposes, except for those sections, if any, that are inconsistent with this application.

FIELD

Various embodiments generally may relate to the field of wireless communications.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

BRIEF DESCRIPTION OF THE FIGURES

FIGS. 11-14 illustrate example procedures for practicing the various embodiments discussed herein.

DETAILED DESCRIPTION

Figure 1:
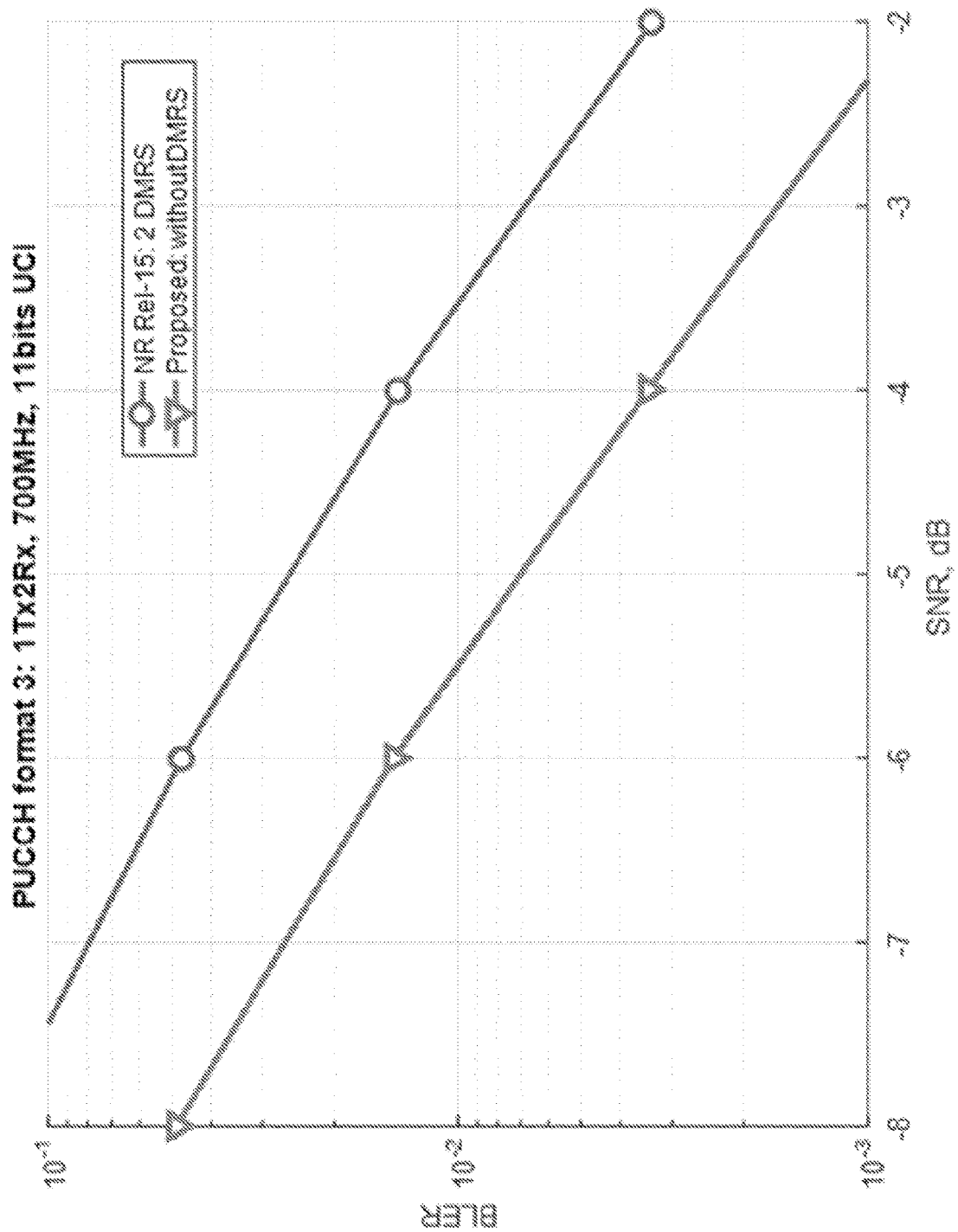
FIG. 1 illustrates a performance comparison for physical uplink control channel (PUCCH) with and without demodulation reference signal (DMRS), in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

For cellular system, coverage is an important factor for successful operation. Compared to LTE, NR can be deployed at relatively higher carrier frequency in frequency range 1 (FR1), e.g., at 3.5 GHz. In this case, coverage loss is expected due to larger path-loss, which makes it more challenging to maintain an adequate quality of service. Typically, uplink coverage is the bottleneck for system operation considering the low transmit power at UE side.

In NR Rel-15, short physical uplink control channel (PUCCH) (PUCCH formats 0 and 2) can span 1 or 2 symbols and long PUCCH (PUCCH formats 1, 3 and 4) can span from 4 to 14 symbols within a slot. More specifically, PUCCH format 0 can be used to carry up to 2 uplink control information (UCI) bits: It is designed based on sequence selection mechanism, where the information bit is used to select a sequence to be transmitted. The sequence is a computer generated sequence (CGS) with length 12 and low peak-to-average power ratio (PAPR) property.

PUCCH format 1 can be used to carry up to 2 UCI bits. Further, one or two UCI bits are first modulated as BPSK or QPSK symbols and then multiplied by a CGS with length 12 and low PAPR property.

PUCCH format 2 can be used to carry more than 2 UCI bits. It is based on OFDM waveform, where demodulation reference signal (DMRS) is interleaved with the UCI symbols within the allocated resource. The number of physical resource blocks (PRB) can be configured from 1 to 16.

PUCCH format 3 can be used to carry more than 2 UCI bits. It is based on DFT-s-OFDM waveform, where DMRS and UCI symbols are multiplexed in a time division multiplexing (TDM) manner.

PUCCH format 4 can be used to carry more than 2 UCI bits and spans 1 PRB in frequency. Further, pre-discrete Fourier transform (DFT) blocked-wise sequence is applied on the modulated UCI symbols to allow multiple UEs to be multiplexed in the same PRB.

For long PUCCH, e.g., PUCCH format 1, 3 and 4, a number of slots can be configured to further enhance the coverage. Note that when repetition is employed, same time domain resource allocation (TDRA) for the transmission of PUCCH is used in each slot. Further, inter-slot frequency hopping can be configured to improve the performance by exploiting frequency diversity.

To further improve the coverage, especially when the UCI payload size is relatively small, gNB receiver may rely on non-coherent detection of PUCCH. In this case, demodulation reference signal (DMRS) associated with PUCCH transmission may not be needed. Note that in NR, sequence used for PUCCH format 1 and format 3 when UCI payload is less than 12 bits would lead to undesirable cross-correlation property, which significantly degrades the performance, especially when non-coherent detection algorithm is employed at the receiver. To improve the detection performance, certain enhancement may need to be considered for sequence based PUCCH scheme and PUCCH coverage enhancement.

Embodiments herein include systems and methods for enhanced PUCCH transmission scheme. For example, some embodiments relate to sequence-based transmission scheme. Embodiments may be used in a wireless cellular network, such as a NR network. Embodiments may improve PUCCH coverage.

I.1 Enhanced PUCCH Format 1 for Sequence Based Transmission Scheme

Embodiments of enhanced scheme for PUCCH format 1 for sequence-based transmission scheme are provided as described further below.

In one embodiment, multiple orthogonal sequences can be defined for transmission of PUCCH format 1. Further, sequence may be directly mapped to allocated resource for PUCCH format 1 without associated DMRS in accordance with UCI payload information.

In one option, Zadoff-Chu (ZC) sequences with different root indexes may be used for sequence generation for PUCCH format 1. In particular, assuming UCI payload information as n, the sequence group identity parameter u can be generated as a function of UCI payload information n, where n can be bit {0, 1} for 1 bit UCI payload and bit {0, 1, 2, 3} for 2 bit UCI payload.

More specifically, sequence group identity parameter can be defined as

Option 1: $u(n)=(f_{gh}+f_{ss}(n))$ mod 30.
Option 2: $u(n)=(f_{gh}(n)+f_{ss})$ mod 30
Option 3: $u(n)=(f_{gh}(n)+f_{ss}(n))$ mod 30.
Option 4: $u(n)=(f_{gh}+f_{ss}+n)$ mod 30

In one example, the updated text in the Section 6.3.2.2.1 in 3GPP Technical Standard (TS) 38.211, V16.1.0 (hereinafter "TS38.211" or "[1]") can be updated as follow in bold for $f_{ss}$.

$f_{ss}(n)=(n_{ID}+n)$ mod 30 where $n_{ID}$ is given by the higher-layer parameter hoppingId if configured, otherwise $n_{ID}=N_{ID}^{CELL}$, n is UCI information.

In another example, the updated text in the Section 6.3.2.2.1 in TS38.211 [1] can be updated as follows in bold for $f_{gh}$.

$$f_{gh}(n) = \left(\sum_{m=0}^{7} 2^m c\left(8(2n_{s,f}^{\mu} + n_{hop}) + m\right) + n\right) \mod 30$$

Where n is UCI information.

In another embodiment, Zadoff-Chu (ZC) sequences with different cyclic shifts may be used for sequence generation for PUCCH format 1. In particular, assuming UCI payload information as n, the cyclic shift parameter a can be generated as a function of UCI payload information n, where n can be bit {0, 1} for 1 bit UCI payload and bit {0, 1, 2, 3} for 2 bit UCI payload.

In one example, the updated text in the Section 6.3.2.2.12 in TS38.211 [1] can be updated as follows in bold for cyclic shift parameter a $$\alpha = \frac{2\pi}{N_{sc}^{RB}}\left(\left(m_0 + m_{sc} + m_{int} + n_{cs\left(n_{s,f}^{\mu}, l+l'\right)} + n\right) \mod N_{sc}^{RB}\right)$$

Where n is UCI information.

In another example, cyclic shift parameter a can be defined as $$\alpha = \frac{2\pi}{N_{sc}^{RB}}\left(\left(m_0 + m_{sc} + m_{int} + n_{cs\left(n_{s,f}^{\mu}, l+l'\right)} + \frac{N_{sc}^{RB}}{M}n\right) \mod N_{sc}^{RB}\right)$$

Where n is UCI information; M is an integer which can be predefined in the specification.

In one example, for PUCCH format 1 with 1 bit UCI payload, cyclic shift parameter a can be defined as $$\alpha = \frac{2\pi}{N_{sc}^{RB}}\left(\left(m_0 + m_{sc} + m_{int} + n_{cs\left(n_{s,f}^{\mu}, l+l'\right)} + \frac{N_{sc}^{RB}}{2}n\right) \mod N_{sc}^{RB}\right)$$

For PUCCH format 1 with 2 bit UCI payload, cyclic shift parameter a can be defined as $$\alpha = \frac{2\pi}{N_{sc}^{RB}}\left(\left(m_0 + m_{sc} + m_{int} + n_{cs\left(n_{s,f}^{\mu}, l+l'\right)} + \frac{N_{sc}^{RB}}{4}n\right) \mod N_{sc}^{RB}\right)$$

I.2 Enhanced PUCCH Format 3 for Sequence-Based Design

Embodiments of enhanced design for PUCCH format 3 for sequence-based transmission scheme are provided as described further below.

In one embodiment, scrambling sequence generation for PUCCH format 3 is modified in order to ensure desirable cross-correlation property for different sequences, which can help in improving detection performance at receiver. In particular, scrambling sequence may be initialized as a function of partial or full UCI payload information.

In one option, the following formula can be used for determination of initialization value for scrambling sequence generation for PUCCH format 3:

$c_{init}=n_{RNTI} \cdot 2^{15}+n_{ID}+F(n)$

Where n is partial or full UCI payload information, which can be described as decimal value, e.g., n∈[0 . . . $2^N-1$], where N is number of UCI bits. Note that examples of function F(n) can be listed as follows:

$$F(n) = \begin{cases} 0, & n < N/2 \\ c_1 2^{10}, & n \geq \frac{N}{2}, c_1 = [1 \ldots 31] \end{cases} \quad \text{Option 1}$$

$$F(n) = \begin{cases} 0, & n < N/2 \\ c_1 2^{10} + n, & n \geq \frac{N}{2}, c_1 = [0 \ldots 31] \end{cases} \quad \text{Option 2}$$

$$F(n) = \begin{cases} 0, & n < N/2 \\ 2^{10} \text{floor}\left(\frac{2^6 n}{N}\right), & n \geq \frac{N}{2} \end{cases} \quad \text{Option 3}$$

$$F(n) = n \quad \text{Option 4}$$

$$F(n) = 2^{10} \text{floor}\left(\frac{2^5 n}{N}\right) \quad \text{Option 5}$$

$$F(n) = \begin{cases} 0, & n < N/2 \\ c_0, & n \geq \frac{N}{2} \end{cases} \quad \text{Option 6}$$

Note that in the above equations, $c_0$ and $c_1$ are predefined values in the specification.

In another option, two scrambling IDs may be configured for PUCCH format 3, where a first scrambling ID may be applied when UCI payload n<N/2 and a second scrambling ID may be applied when UCI payload n≥N/2. In particular, the scrambling sequence generation can be modified as $$c_{init} = \begin{cases} n_{RNTI} \cdot 2^{15} + n_{ID}^0, & \text{when } n < N/2 \\ n_{RNTI} \cdot 2^{15} + n_{ID}^1, & \text{when } n \geq \frac{N}{2} \end{cases}$$

Where $n_{ID}^0$ and $n_{ID}^1$ are scrambling IDs, which are configured for PUCCH.

In another embodiment, after encoding, modulated symbol for PUCCH format 3 may be multiplied by a sequence which depends on UCI payload information. Additional phase offset may be applied on the modulated symbols for PUCCH.

The updated text in the Section 6.3.2.6.2 in TS38.211 [1] can be highlighted as follow in bold:

For PUCCH format 3, if interlaced mapping is not configured, no block-wise spreading is applied and $$y(lM_{sc}^{PUCCH,3}+k) = d(lM_{sc}^{PUCCH,3}+k) * w_{PUCCH,3}(n)(k \mod K)$$

$$k=0,1,\ldots M_{sc}^{PUCCH,3}-1$$

$$l=0,1,\ldots (M_{symb}/M_{sc}^{PUCCH,3})-1$$

$w_{PUCCH,3}$ is a set of phase offsets for PUCCH format 3, K is size of $w_{PUCCH,3}$ Note that PUCCH format 3 UCI payload value (n) in decimal interpretation can be described as n∈[0 . . . $2^N$-1], where N is number of UCI bits. Further, $W_{PUCCH,3}$ could be defined in following form:

$$w_{PUCCH,3} = \begin{cases} 0, & \text{for } n < \frac{N}{2} \\ \text{phase\_set}, & \text{for } n \geq \frac{N}{2} \end{cases}$$

where phase_set is a fixed size set of phase offsets. As an example, following options can be used for the set representation:

$$\text{phase\_set} = \left[0, \frac{\pi}{2}, \pi, \frac{3\pi}{2}\right] \quad \text{Option 1}$$

$$\text{phase\_set} = \left[0, \pi, \frac{\pi}{2}, \frac{3\pi}{2}\right] \quad \text{Option 2}$$

In another embodiment, the first column for Reed-Muller (RM) code generation may be removed. In this case, the number of input bits can be from 3 to 10 bits.

In one example, the text in the Section 5.3.3.3 in 3GPP TS 38.212, V16.1.0 (hereinafter "TS38.212 or "[2]") can be updated as follow in bold:

For 3≤K≤10, the code block is encoded by $d_i = (\Sigma_{K=0}^{K-1} c_k \cdot M_{i,k})$ mod 2, where i=0, 1, . . . , N-1, N=32, and $M_{i,k}$ represents the basis sequences as defined in Table 5.3.3.3-1.

TABLE 5.3.3.3-1

| | Basis sequences for (32, K) code | | | | | | | | | |
|---|---|---|---|---|---|---|---|---|---|---|
| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
| 0 | 1 | 0 | 0 | 0 | 0 | 0 | 0 | 0 | 0 | 1 |
| 1 | 1 | 1 | 0 | 0 | 0 | 0 | 0 | 0 | 1 | 1 |
| 2 | 0 | 0 | 1 | 0 | 0 | 1 | 0 | 1 | 1 | 1 |
| 3 | 0 | 1 | 1 | 0 | 0 | 0 | 0 | 1 | 0 | 1 |
| 4 | 1 | 1 | 1 | 0 | 0 | 0 | 1 | 0 | 0 | 1 |
| 5 | 1 | 0 | 0 | 1 | 0 | 1 | 1 | 1 | 0 | 1 |
| 6 | 0 | 1 | 0 | 1 | 0 | 1 | 0 | 1 | 1 | 1 |
| 7 | 0 | 0 | 1 | 1 | 0 | 0 | 1 | 1 | 0 | 1 |
| 8 | 1 | 0 | 1 | 1 | 0 | 0 | 1 | 0 | 1 | 1 |
| 9 | 0 | 1 | 1 | 1 | 0 | 1 | 0 | 0 | 1 | 1 |
| 10 | 0 | 1 | 0 | 0 | 1 | 1 | 1 | 0 | 1 | 1 |
| 11 | 1 | 1 | 0 | 0 | 1 | 1 | 0 | 1 | 0 | 1 |
| 12 | 0 | 0 | 1 | 0 | 1 | 0 | 1 | 1 | 1 | 1 |
| 13 | 1 | 0 | 1 | 0 | 1 | 0 | 1 | 0 | 1 | 1 |
| 14 | 0 | 0 | 0 | 1 | 1 | 0 | 1 | 0 | 0 | 1 |
| 15 | 1 | 0 | 0 | 1 | 1 | 1 | 1 | 0 | 1 | 1 |
| 16 | 1 | 1 | 0 | 1 | 1 | 1 | 0 | 0 | 1 | 0 |
| 17 | 0 | 0 | 1 | 1 | 1 | 0 | 0 | 1 | 0 | 0 |
| 18 | 1 | 0 | 1 | 1 | 1 | 1 | 1 | 0 | 0 | 0 |
| 19 | 0 | 1 | 1 | 0 | 0 | 1 | 1 | 0 | 0 | 0 |
| 20 | 0 | 1 | 0 | 0 | 0 | 1 | 0 | 0 | 0 | 1 |
| 21 | 1 | 0 | 1 | 0 | 0 | 0 | 0 | 0 | 1 | 1 |
| 22 | 0 | 0 | 0 | 1 | 0 | 0 | 1 | 1 | 0 | 1 |
| 23 | 1 | 1 | 0 | 1 | 0 | 0 | 0 | 1 | 1 | 1 |
| 24 | 1 | 1 | 1 | 1 | 0 | 1 | 1 | 1 | 0 | 0 |
| 25 | 1 | 0 | 0 | 0 | 1 | 1 | 0 | 0 | 0 | 1 |
| 26 | 0 | 1 | 1 | 0 | 1 | 0 | 0 | 1 | 1 | 0 |
| 27 | 1 | 1 | 1 | 0 | 1 | 0 | 1 | 1 | 1 | 0 |
| 28 | 0 | 1 | 0 | 1 | 1 | 0 | 1 | 0 | 0 | 0 |
| 29 | 0 | 1 | 1 | 1 | 1 | 1 | 1 | 1 | 0 | 0 |
| 30 | 1 | 1 | 1 | 1 | 1 | 1 | 1 | 1 | 1 | 1 |
| 31 | 0 | 0 | 0 | 0 | 0 | 0 | 0 | 0 | 0 | 0 |

In another option, the first column for RM code may be updated as "1" in the first half and "0" in the second half.

In another embodiment, sequence representing UCI payload information is transmitted on the symbols which are allocated for UCI transmission. DMRS symbols are present in the PUCCH format 3. Note that same DMRS patterns as defined for PUCCH format 3 can be reused. In this case, the length of sequence is determined on the number of symbols which are allocated for UCI transmission, the number of REs allocated for PUCCH format 3 and modulation order.

II. Transmission Scheme for NR PUCCH Coverage Enhancements

As mentioned above, for long PUCCH (e.g., PUCCH formats 1, 3 and 4), a number of slots can be configured to further enhance the coverage. Note that when repetition is employed, same time domain resource allocation (TDRA) for the transmission of PUCCH is used in each slot. Further, inter-slot frequency hopping can be configured to improve the performance by exploiting frequency diversity. To further improve the coverage, especially when the UCI payload size is relatively small, a gNB receiver (Rx) may rely on non-coherent detection of PUCCH. In this case, demodulation reference signal (DMRS) associated with PUCCH transmission may not be needed. FIG. 1 illustrates performance comparison between PUCCH transmission with and without DMRS. In the figure, it is assumed PUCCH format 3 with 11 bit UCI payload. Further, PUCCH spans 14 symbols and occupies 1 PRB. From the figure, it can be observed that when employing non-coherent detection based receiver algorithm, PUCCH transmission without DMRS can achieve better performance than PUCCH transmission with DMRS. Transmission scheme embodiments for PUCCH for NR coverage enhancement are described further below.

In one embodiment, for PUCCH format 1, BPSK is used as modulation for 1 bit HARQ-ACK feedback and QPSK is used as modulation for 2 bit HARQ-ACK feedback. Further, modulated symbol is multiplied with a length-12 sequence in frequency domain and with orthogonal cover code (OCC). Further, the modulated sequences are directly mapped to the allocated resource which is configured for PUCCH format 1. Note that DMRS is not transmitted on the resource allocated for the PUCCH format 1.

For PUCCH format 1 without DMRS, length-12 sequence can be reused in accordance with NR specification. In particular, sequence can be generated in accordance with Section 5.2.2.2 in [1] Sequence and cyclic shift hopping can be reused in accordance with clause III.2 (infra) or clause 6.3.2.2 in [1]. In various embodiments, the PUCCH format 1 sequence γ(n) assigned to the original data symbols is $r_{u,v}^{(\alpha,\delta)}(n)$ multiplied by d(0) which is from UCI bits. Further, the sequence γ(n) assigned to the original DMRS symbols is $r_{u,v}^{(\alpha,\delta)}$ multiplied by the conjugated value of d(0). The initial cyclic shift of PUCCH transmission in different symbols may not be the same.

Figure 2:
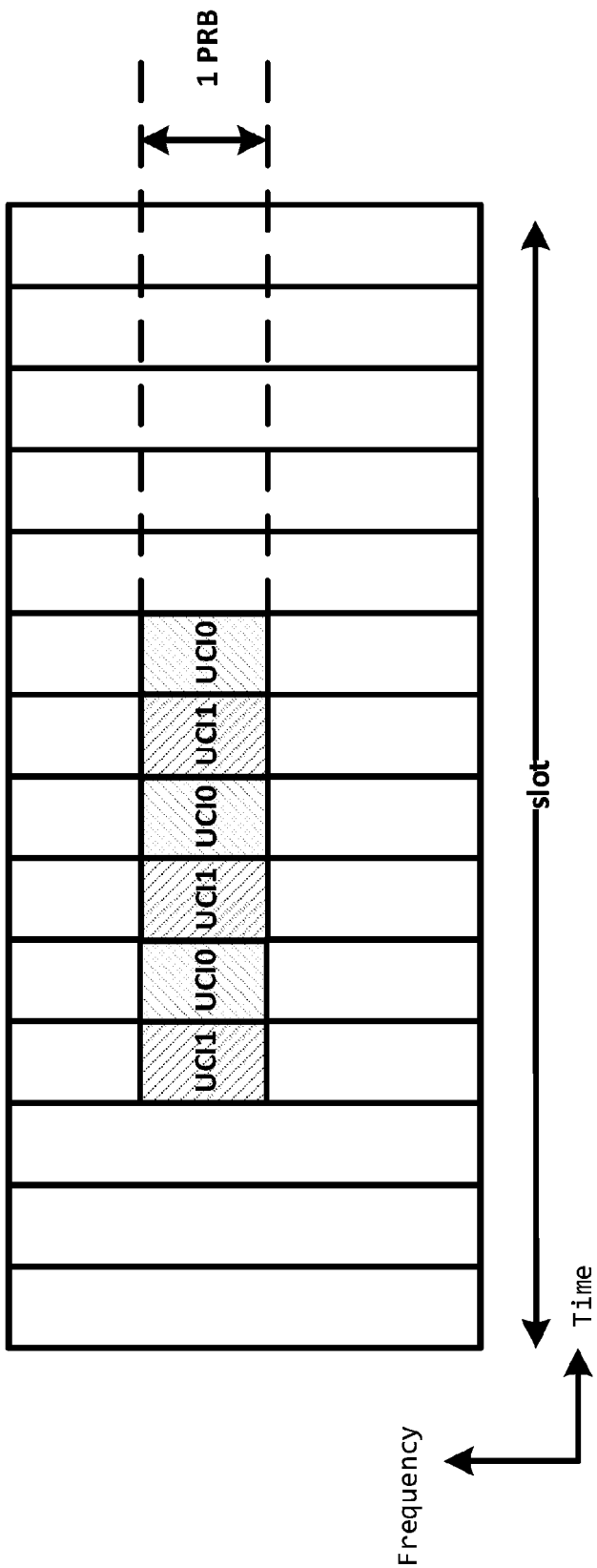
FIG. 2 illustrates a PUCCH format 1 without DMRS, in accordance with various embodiments.

FIG. 2 illustrates one example of PUCCH format 1 without DMRS according to various embodiments. In this example, PUCCH format 1 spans 6 symbols in time within a slot and occupies 1 physical resource block (PRB) in frequency. Further, all 6 symbols are used for the transmission of either d(0) of UCI or conjugated d(0) of UCI for PUCCH format 1, i.e., the DMRS symbols are replaced by their original sequences multiplied by the conjugated value of d(0). Note that in the figure, UCI0 indicates the length-12 sequence multiplied by d(0) while UCI1 indicates the length-12 sequence multiplied by conjugated value of d(0).

In one embodiment, to allow coexistence of PUCCH format 1 as defined in Rel-15 and PUCCH format 1 without DMRS in same time and frequency resource, time domain OCC can be applied on odd/UCI1 and even/UCI0 symbols, respectively, when intra-slot frequency hopping is disabled. When intra-slot frequency hopping is enabled, OCC is applied on odd and even UCI symbols in each hop, respectively. Note that odd and even UCI symbols are defined relative to the first symbol of PUCCH transmission, not relative to slot boundary. For this option, the maximum OCC length can be kept as 7 and OCC sequence can be reused in accordance with Table III.4.1-2 (infra) or Table 6.3.2.4.1-2 in [1].

Further, same or different OCC sequence index can be configured for the odd and even UCI symbols for PUCCH format 1, respectively. In case when different OCC sequence indexes are configured for odd and even UCI symbols for PUCCH format 1, separate timeDomainOCC may be defined.

Figure 3:
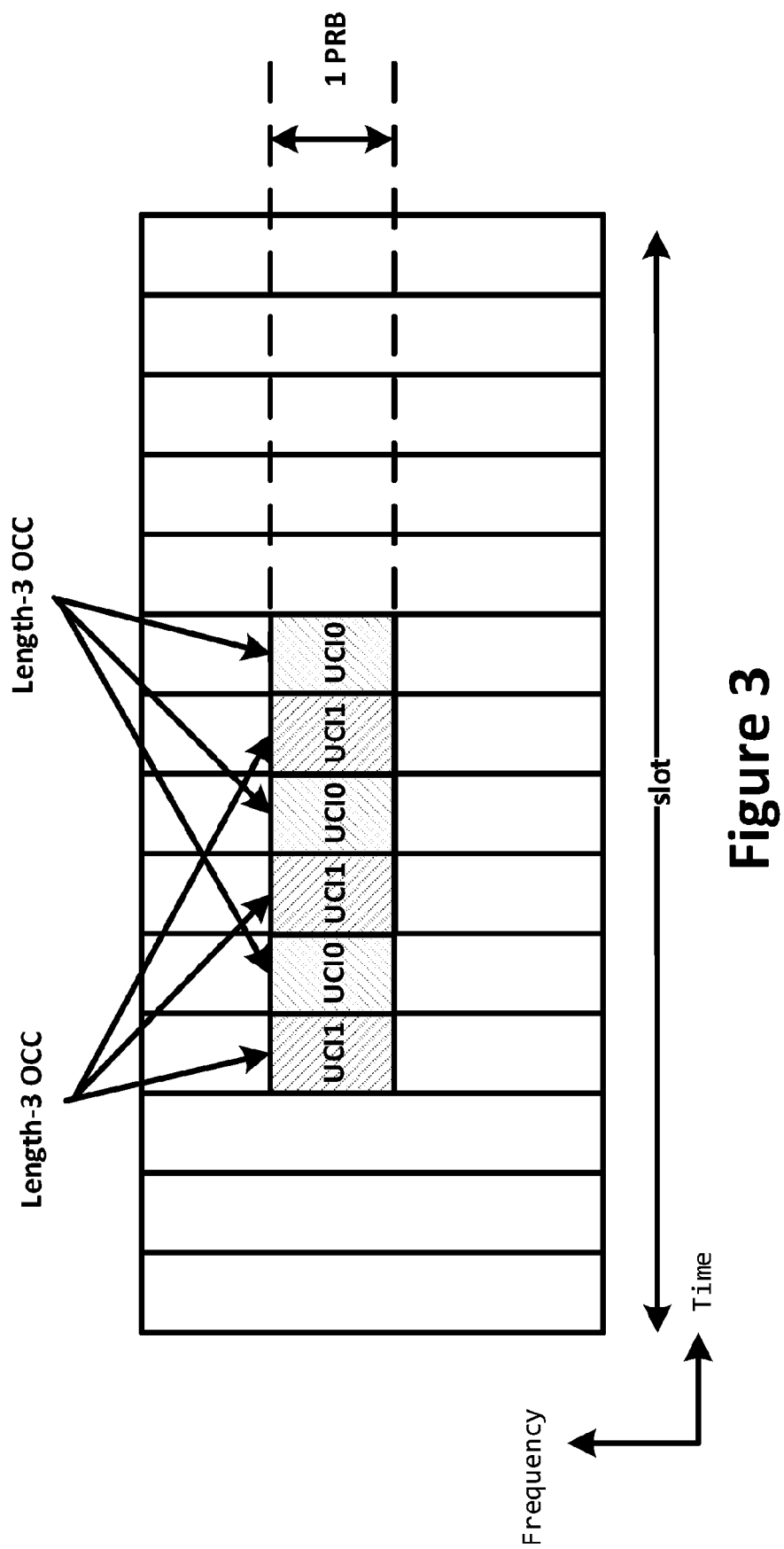
FIG. 3 illustrates an orthogonal cover code (OCC) for a PUCCH format 1 without DMRS, in accordance with various embodiments.

FIG. 3 illustrates one example of applying OCC on PUCCH format 1 without DMRS, according to various embodiments. In this example, length-3 OCC is applied for even and odd UCI symbols, respectively. The indices of these two OCC's may not be necessary the same.

Figure 4:
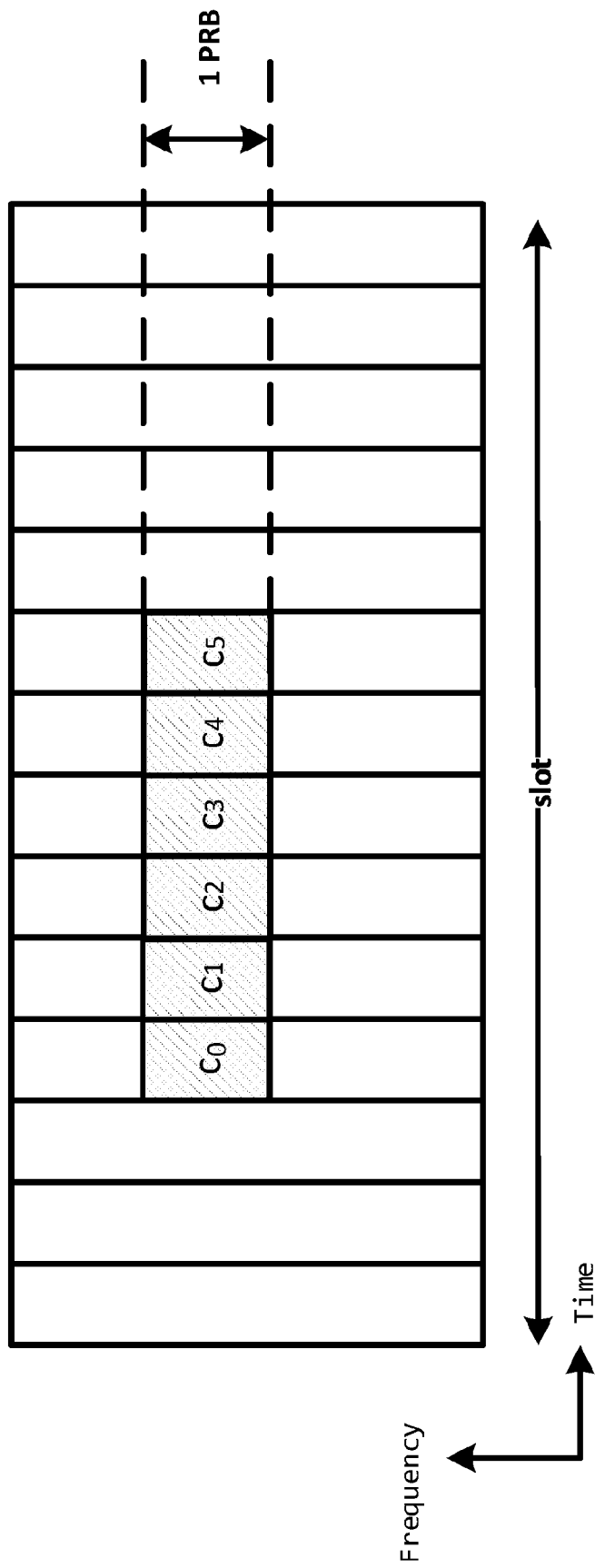
FIG. 4 illustrates an example sequence for a PUCCH format 1 without DMRS, in accordance with various embodiments.

In another embodiment, the complex number d(0) may be replaced by a sequence from a sequence set where a sequence is ono-to-one mapping to a value of UCI bit(s). More specifically, assume the number of symbols of PUCCH format 1 is K. Denote a sequence in the sequence set as $C=\{c_0, c_1, c_2, \ldots c_{K-1}\}$ where $c_i$, i=0,1, ..., K-1 can be any type of numbers, such as binary or complex. Then $c_i$ may be used to multiply with $r_{u,v}^{(\alpha,\delta)}(n)$ sequence for the symbol i of PUCCH format 1. FIG. 4 illustrates the symbol pattern of PUCCH format 1 generated by a sequence C, according to various embodiments.

As one example of PUCCH format 1 with K symbols, multiple UEs share the resource by length-12 orthogonal sequences. Further, different UEs use different cyclic shift at a PUCCH symbol. For 1-bit UCI, two binary sequences of length K can be used to represent the bit. One sequence may be all 1's and the other may be with first $\lfloor K/2 \rfloor$ bits all 1's and the remaining $K-\lfloor K/2 \rfloor$ all −1's. In general, the sequence set for PUCCH format 1 with length K can be generated by complete searching of K-bits binary sequences for maximum hamming distances between any pair of sequences, for 4≤K≤14.

As another example of multiple UEs sharing the PUCCH format 1 allocated resource of K symbols, orthogonal sequence of length K can be applied. More specifically, a set of ¾ sequences of length K may be assigned to a UE with ½ bits UCI. All sets need to be orthogonal to each other theoretically.

In another embodiment, multiple orthogonal sequences can be defined for transmission of PUCCH format 1. In particular, For positive SR, one sequence can be configured for a UE;

For 1 bit HARQ-ACK feedback, two orthogonal sequences can be configured for a UE. Further, bit '0' may be mapped to a first sequence and bit '1' may be mapped to a second sequence.

For 2 bit HARQ-ACK feedback, four orthogonal sequences can be configured for a UE. Table 1 illustrates the example of mapping UCI payload to sequence for PUCCH format 1.

TABLE 1

Mapping UCI payload to sequence for PUCCH format 1

| UCI payload | Sequence for PUCCH format 1 |
|---|---|
| '00' | $1^{st}$ sequence provided by higher layer |
| '01' | $2^{nd}$ sequence provided by higher layer |
| '10' | $3^{rd}$ sequence provided by higher layer |
| '11' | $4^{th}$ sequence provided by higher layer |

Note that the sequence may be directly mapped to allocated resource for PUCCH format 1. In this case, DMRS is not transmitted in PUCCH format 1. Alternatively, a sequence may be mapped to the resource for UCI transmission. This sequence is selected from configured 2 sequences representing 1-bit UCI and 4 sequences representing 2-bits UCI. In this case, the DMRS positions in accordance with Section 6.4.1.3.1 in [1] can be reused to transmit the selected sequence. Since there are 12 orthogonal sequences defined for PUCCH in frequency in NR specification, the total number of UEs sharing the same resource simultaneously could be between 3 and 6 in principle, depends on the number of bits used by UEs for UCI transmission.

As one example of sequences mapping to UCI payload, the length-12 sequence defined in NR specification for PUCCH format 1, can be reused for the proposed PUCCH format 1. More specifically, instead of being the product of the complex-value symbol d(0) and the sequence $r_{u,v}^{(\alpha,\delta)}$ in clause III.4 (infra) or 6.3.2.4 of [1], the proposed PUCCH format 1 sequence y(n) is the sequence $r_{u,v}^{(\alpha,\delta)}(n)$ whose cyclic shift is also determined by UCI bit(s) value as in PUCCH format 0. This can be realized by modifying the following sentence in clause III.2.2 (infra) or 6.3.2.2.2 of [1], as shown below:

$m_{cs}$=0 except for PUCCH format 0 and 1 when it depends on the information to be transmitted according to subclause 9.2 of [2].

Further, the text in Section 9.2.3 of [2] after Table 9.2.3-4 can be updated as shown below:

If a UE transmits a PUCCH with HARQ-ACK information using PUCCH format 1, the UE is provided a value for $m_o$ by initialCyclicShift of PUCCH-format1 or, if initialCyclicShift is not provided, by the initial cyclic shift index as described in Clause 9.2.1 and $m_{cs}$ is determined from the value of one HARQ-ACK information bit or from the values of two HARQ-ACK information bits as in Table 9.2.3-3 and Table 9.2.3-4, respectively.

As a further extension, orthogonal sequence can be defined as a combination of length-12 sequence in frequency domain and OCC in time domain. Further, different initial cyclic shift values and/or OCC indexes can be configured to generate 2 or 4 orthogonal sequences for 1 or 2 bit HARQ-ACK feedback.

In one example, assuming length-12 sequence in frequency is reused in accordance with NR specification, this indicates that up to 12 orthogonal sequences can be generated by using 12 different cyclic shift values. Further, depending on the length of PUCCH format 1, i.e., length K, the number of orthogonal sequences $w_i(m)$ of Section 6.3.2.4.1 of [1] in time by using different OCC indexes can be up to K. In this case, the number of UEs which can be multiplexed in a same time and frequency resource for PUCCH format 1 can be between 3·K and 6·K for 1-bit and 2-bit UCI, respectively.

Since the OCC length is only up to 7 in NR specification and the number of PUCCH format 1 symbols could be 14 when intra-slot frequency hopping is disabled, if the number of symbols is larger than 7 when intra-slot frequency hopping is disabled, two options can be considered to apply OCC for multiple UEs.

In one option, OCC code can be extended to support the length which is larger than 7. Note that the OCC code can be generated based on discrete Fourier transform (DFT) based orthogonal code.

In another option, transmission of sequence based PUCCH format 1 can be partitioned into multiple groups, where each group has not larger than 7 symbols. Note that OCC is applied for these groups, separately. Further, same or different OCC sequence index can be configured for the groups for PUCCH format 1. In case when different OCC sequence indexes are configured, separated timeDomain-OCC may be defined for each of these groups.

In one example, K symbols are partitioned into 2 groups when intra-slot frequency hopping is disabled, where $\lfloor K/2 \rfloor$ symbols are allocated for the first group and $K-\lfloor K/2 \rfloor$ symbols are allocated for the second group.

In another example, K symbols are partitioned into 2 groups regardless of whether intra-slot frequency hopping is disabled or enabled, where $\lfloor K/2 \rfloor$ symbols are allocated for the first group and $K-\lfloor K/2 \rfloor$ symbols are allocated for the second group.

In another example, when K>7 and intra-slot frequency hopping is disabled, these K symbols are partitioned into 2 groups, where $\lfloor K/2 \rfloor$ symbols are allocated for the first group and $K-\lfloor K/2 \rfloor$ symbols are allocated for the second group.

Figure 5:
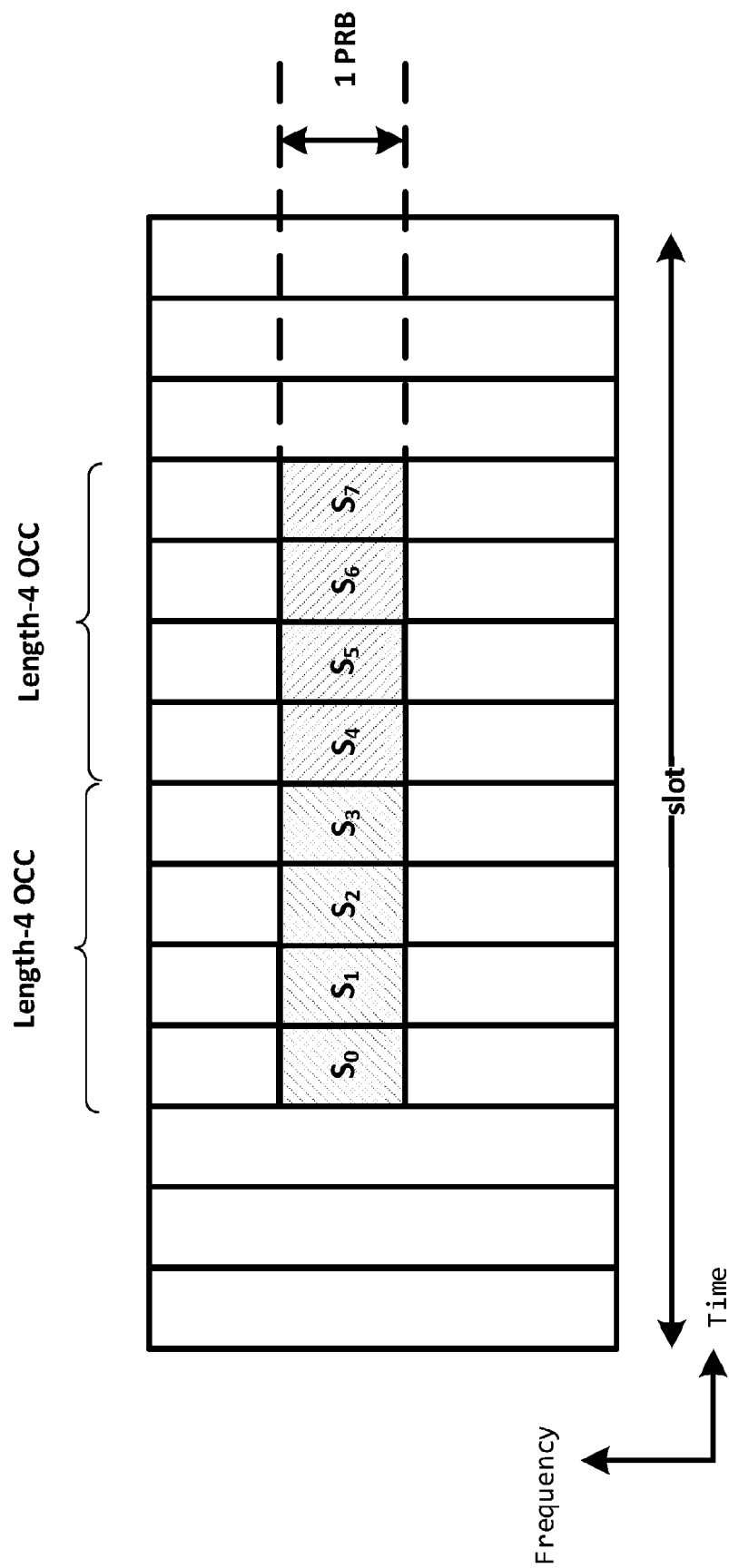
FIG. 5 illustrates a symbol partition for a PUCCH format 1 of more than seven symbols, in accordance with various embodiments.

FIG. 5 illustrates an example of symbol partition for PUCCH format 1 of more than 7 symbols according to various embodiments. In this example, 8 symbols are allocated for PUCCH format 1 without DMRS. Further, these 8 symbols are partitioned into two groups, where each group has 4 symbols. Note that length-4 OCC is applied for the first and second group with 4 symbols, respectively.

In another embodiment, a UE can be configured with 2 different cyclic shift values in frequency and 2 different OCC indexes in time for 4 orthogonal sequences. Alternatively, a UE can be configured with 4 different cyclic shift values in frequency and 1 OCC index in time for 4 orthogonal sequences. In another example, a UE can be configured with 1 cyclic shift value in frequency and 4 different OCC indexes in time for 4 orthogonal sequences.

Table 2 illustrates one example of mapping UCI payload to sequence for PUCCH format 1. In the example, separate initial cyclic shift values and OCC indexes are configured for different UCI payload.

TABLE 2

Mapping UCI payload to sequence for PUCCH format 1: Example 1

| UCI payload | Sequence for PUCCH format 1 |
| --- | --- |
| '00' | {$1^{st}$ initial cyclic shift value, $1^{st}$ OCC index} provided by higher layer |
| '01' | {$2^{nd}$ initial cyclic shift value, $2^{nd}$ OCC index} provided by higher layer |
| '10' | {$3^{rd}$ initial cyclic shift value, $3^{rd}$ OCC index} provided by higher layer |
| '11' | {$4^{th}$ initial cyclic shift value, $4^{th}$ OCC index} provided by higher layer |

In one example, for the PUCCH format 1 with K symbols, a UE may be assigned 2 initial cyclic shifts and 2 length-K OCC indices. Table 3 illustrates one example of mapping UCI payload to sequence for proposed PUCCH format 1. In the example, 2 initial cyclic shifts of 0 and 6, and 2 time domain OCC indexes of 0 and 1 are allocated for a UE. Note that other examples can be straightforwardly extended from the example.

TABLE 3

Mapping UCI payload to sequence for PUCCH format 1: Example 2

| UCI payload | Sequence for PUCCH format 1 |
|---|---|
| '00' | {initialCyclicShift = 0, timeDomainOCC = 0} provided by higher layer |
| '01' | {initialCyclicShift = 0, timeDomainOCC = 1} provided by higher layer |
| '10' | {initialCyclicShift = 6, timeDomainOCC = 0} provided by higher layer |
| '11' | {initialCyclicShift = 6, timeDomainOCC = 1} provided by higher layer |

In another embodiment, for PUCCH format 3, when UCI payload size is less than K bits, after encoding and modulation, the modulated symbols are directly mapped to the allocated resource for PUCCH transmission. Additionally, phase rotation procedure can be applied to the modulated symbols. For this option, DMRS is not present in the allocated resource for PUCCH format 3. Note that K can be predefined in the specification or configured by higher layers via NR remaining minimum system information (RMSI), NR other system information (OSI) or dedicated radio resource control (RRC) signalling. In one example, K=12. Further, for encoding process, UE performs rate-matching for encoded bits on the allocated resource for PUCCH format 3 transmission.

Figure 6:
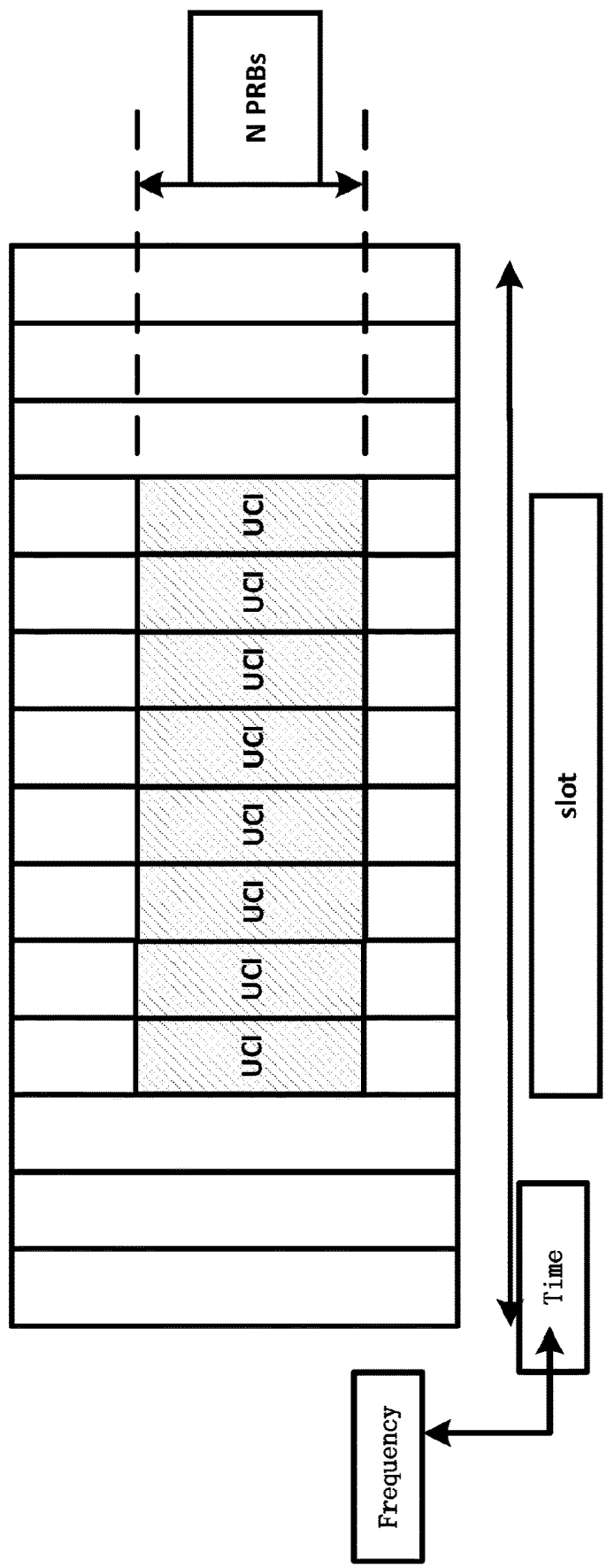
FIG. 6 illustrates a PUCCH format 3 without DMRS, in accordance with various embodiments.

FIG. 6 illustrates an example of PUCCH format 3 without DMRS according to various embodiments. In this example, PUCCH format 3 spans 8 symbols in time within a slot and occupies N PRBs in frequency, where N is configured by higher layers. Further, all 8 symbols are used for the transmission of UCI for PUCCH format 3, i.e., no DMRS symbols are present within PUCCH format 3.

In another embodiment, multiple sequences can be defined for transmission of PUCCH format 3, when UCI payload size is less than K bits. In particular, assuming $K_{UCI}$ bits for UCI payload size, if a sequence is assigned to represent a value of the $K_{UCI}$ bits, then the number of sequences for transmission of PUCCH format 3 can be up to $2^{K_{UCI}}$.

In one option, multiple long sequences can be generated based on pseudo-random binary sequence (PRBS) of Section 5.2.1 of [1] for PUCCH format 3. Assume the PUCCH format 3 is assigned $N_{PRB}$ PRBs, $L_{symbol}$ number of symbols and UCI payload is $K_{UCI}$ bits. Depending on the modulation of PUCCH format 3, M=2 if QPSK is configured or M=1 if BPSK is configured. Then the length of PRBS is $12 \cdot N_{PRB} \cdot L_{symbol} \cdot M$. The PRBS mapping to a UCI $K_{UCI}$ bits value can be generated with a unique initial seed. Subsequently, UE selects one PRBS based on the UCI payload for transmission. Further, modulation is applied for the selected sequence. In the last step, modulated sequence is directly mapped to the allocated resource for PUCCH format 3 transmission. For this option, DMRS is not present in the allocated resource for PUCCH format 3.

As an example, the initialization seed for the generation of long sequence can be defined as $$c_{init} = n_{UCI} \cdot 2^{10} + n_{ID}$$

Or, $$c_{init} = n_{ID} \cdot 2^{K_{UCI}} + n_{UCI}$$

where $n_{ID} \in \{0,1,\ldots,1023\}$ is the virtual cell ID, which can be configured by higher layers via RRC signalling. $n_{ID} = N_{ID}^{cell}$ if not configured by higher layers. $N_{ID}^{cell}$ is a physical layer cell identity (see e.g., clause 7.4.2.1 in [1]).

$n_{UCI}$ is the value of $K_{UCI}$ bits of UCI payload for PUCCH format 3.

Note that different sequence generation methods may affect the detection performance of the PUCCH format 3 of the embodiments herein. The larger the minimum distance between any pair of sequences, the better the detection performance.

In another embodiment, the initialization seed of the generation of long sequence can be defined as a function of one or more following parameters: Radio Network Temporary Identifier (RNTI), virtual cell ID or scrambling ID, and/or UCI payload information. In particular, the initialization seed of the generation of long sequence can be defined as $$c_{init} = c_0 \cdot n_{RNTI} + c_1 \cdot n_{ID} + c_2 \cdot n_{UCI}$$

Where $c_0$, $c_1$ and $c_2$ are predefined in the specification and can be equal to 0 or $2^k$ where k is an integer which is greater than or equal to 0. Note that different k can be used for $c_0$, $c_1$ and $c_2$. $n_{RNTI}$ is given by Cell RNTI (C-RNTI); $n_{ID} \in \{0,1,\ldots,1023\}$ equals the higher-layer parameter dataScramblingIdentityPUSCH if configured, and $n_{ID} = N_{ID}^{cell}$ otherwise.

In one example, the initialization seed of the generation of long sequence can be defined as $$c_{init} = n_{RNTI} \cdot 2^{14} + n_{ID} \cdot 2^4 + n_{UCI}$$

In another example, the initialization seed of the generation of long sequence can be defined as $$c_{init} = n_{RNTI} \cdot 2^{15} + n_{ID} \cdot 2^4 + n_{UCI}$$

In another example, the initialization seed of the generation of long sequence can be defined as $$c_{init} = n_{RNTI} \cdot 2^{14} + n_{UCI} \cdot 2^{10} + n_{ID}$$

In another example, the initialization seed of the generation of long sequence can be defined as $$c_{init} = n_{RNTI} \cdot 2^{15} + n_{UCI} \cdot 2^{10} + n_{ID}$$

In another embodiment, the initialization seed of the generation of long sequence can be defined as a function of one or more following parameters: Radio Network Temporary Identifier (RNTI), virtual cell ID or scrambling ID. Further, different cyclic shifts based on UCI payload information may be applied for the generation of sequences for new PUCCH format 3.

In one example, the initialization seed of the generation of long sequence can be defined as $$c_{init} = c_0 \cdot n_{RNTI} + c_1 \cdot n_{ID}$$

In one example, the initialization seed of the generation of long sequence can be defined as $$c_{init} = n_{RNTI} \cdot 2^{10} + n_{ID}$$

In one example, the initialization seed of the generation of long sequence can be defined as $$c_{init} = n_{RNTI} \cdot 2^{15} + n_{ID}$$

Further, the sequence used for the UCI transmission can be generated as $$\tilde{b}(i) = c(i + n_{UCI} M_{bit})$$

Where $c(\cdot)$ is the sequence which is generated based on the initialization seed in accordance with section 5.2 in TS38.211 [1]. $\tilde{b}(i)$ is the sequence for UCI transmission before modulation. $M_{bit}$ can be predefined in the specification. In one example, $M_{bit}$ can be equal to the number of bits which are mapped to the PUCCH resource when pi/2 BPSK is used. More specifically, $M_{bit} = 12 \cdot N_{sym}$, where $N_{sym}$ is the number of symbols allocated for PUCCH transmission. For instance, when 14 symbols are allocated for the new PUCCH format 3, $M_{bit} = 168$.

In another embodiment, for the new PUCCH format 3, the sequence, either based on a long sequence or a short sequence for each OFDM symbol, can be transmitted using pi/2 BPSK modulation based on DFT-s-OFDM waveform.

Note that in In case of π/2-BPSK modulation, bit b(i) is mapped to complex-valued modulation symbol d(i) according to $$d(i) = \frac{e^{j\frac{\pi}{2}(i \bmod 2)}}{\sqrt{2}}[(1-2b(i)) + j(1-2b(i))]$$

Figure 7:
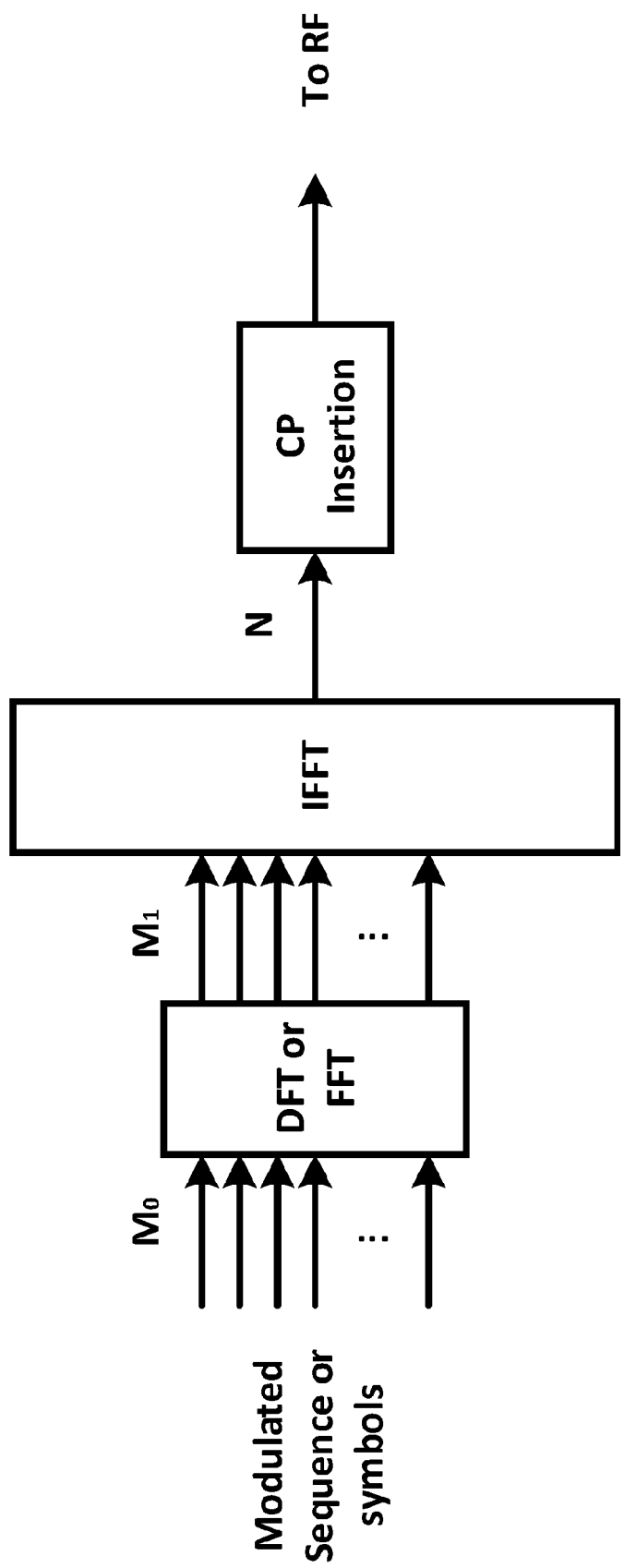
FIG. 7 illustrates an example of sequence-based PUCCH transmission using a Discrete Fourier Transform (DFT)-spread(s)-orthogonal frequency division multiplexing (OFDM) waveform, in accordance with various embodiments.

FIG. 7 illustrates diagram of sequence based PUCCH transmission using DFT-s-OFDM waveform.

In FIG. 7, modulated sequence using pi/2 BPSK with length $M_0$ is input to the DFT or FFT block. Subsequently, the output of DFT or FFT block with length $M_1$ is mapped to the subcarriers in frequency domain as the input to the IFFT block and then converted into time domain signal. The size of IFFT block is N. Typically, $N > M_1 \geq M_0$. For sequence based PUCCH transmission, $M_1 = M_0$.

III. Physical Uplink Control Channel (PUCCH) Format Aspects

Some supporting information from TS38.211 [1] and 38.212 [2] is provided below for context associated with the various embodiments herein.

III.1 General

The PUCCH supports multiple formats as shown in Table III.1-1 or Table 6.3.2.1-1 in [1]. In case intra-slot frequency hopping is configured for PUCCH formats 1, 3, or 4 according to clause 9.2.1 of [2], the number of symbols in the first hop is given by $\lfloor N_{symb}^{PUCCH}/2 \rfloor$ where $N_{symb}^{PUCCH}$ is the length of the PUCCH transmission in OFDM symbols.

TABLE III.1-1

PUCCH formats

| PUCCH format | Length in OFDM symbols $N_{symb}^{PUCCH}$ | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

III.2 Sequence and Cyclic Shift Hopping

PUCCH formats 0, 1, 3, and 4 use sequences $r_{u,v}^{(\alpha,\delta)}(n)$ given by clause 5.2.2 of [1] with $\delta = 0$ where the sequence group u and the sequence number u depend on the sequence hopping in clause III.2.1 or clause 6.3.2.2.1 of [1] and the cyclic shift a depends on the cyclic shift hopping in clause III.2.2 or clause 6.3.2.2.2 of [1].

III.2.1 Group and Sequence Hopping

The sequence group $u = (f_{gh} + f_{ss}) \bmod 30$ and the sequence number v within the group depends on the higher-layer parameter pucch-GroupHopping:

if pucch-GroupHopping equals 'neither'
$f_{gh} = 0$
$f_{ss} = n_{ID} \bmod 30$
$v = 0$
where $n_{ID}$ is given by the higher-layer parameter hoppingId if configured, otherwise $n_{ID} = N_{ID}^{cell}$.

if pucch-GroupHopping equals 'enable'

$$f_{gh} = \left(\sum_{m=0}^{7} 2^m c(8(2n_{s,f}^\mu + n_{hop}) + m)\right) \bmod 30$$

$$f_{ss} = n_{ID} \bmod 30$$

$$v = 0$$

where the pseudo-random sequence c(i) is defined by clause 5.2.1 of [1] and shall be initialized at the beginning of each radio frame with $c_{init} = \lfloor n_{ID}/30 \rfloor$ where $n_{ID}$ is given by the higher-layer parameter hoppingId if configured, otherwise $n_{ID} = N_{ID}^{cell}$.

if pucch-GroupHopping equals 'disable'
$f_{gh} = 0$
$f_{ss} = n_{ID} \bmod 30$
$v = c(2 n_{s,f}^\mu + n_{hop})$
where the pseudo-random sequence c(i) is defined by clause 5.2.1 of [1] and shall be initialized at the beginning of each radio frame with $c_{init} = 2^5 \lfloor n_{ID}/30 \rfloor + (n_{ID} \bmod 30)$ where $n_{ID}$ is given by the higher-layer parameter hoppingId if configured, otherwise $n_{ID} = N_{ID}^{cell}$.

The frequency hopping index $n_{hop} = 0$ if intra-slot frequency hopping is disabled by the higher-layer parameter intraSlotFrequencyHopping. If frequency hopping is enabled by the higher-layer parameter intraSlotFrequencyHopping, $n_{hop} = 0$ for the first hop and $n_{hop} = 1$ for the second hop.

III.2.2 Cyclic Shift Hopping

The cyclic shift a varies as a function of the symbol and slot number according to:

$$\alpha_l = \frac{2\pi}{N_{sc}^{RB}}\left((m_0 + m_{cs} + m_{int} + n_{cs}(n_{s,f}^\mu, l + l')) \bmod N_{sc}^{RB}\right)$$

where
$n_{s,f}^\mu$ is the slot number in the radio frame
l is the OFDM symbol number in the PUCCH transmission where l=0 corresponds to the first OFDM symbol of the PUCCH transmission,
l' is the index of the OFDM symbol in the slot that corresponds to the first OFDM symbol of the PUCCH transmission in the slot given by [2]
$m_0$ is given by [2] for PUCCH format 0 and 1 while for PUCCH format 3 and 4 is defined in clause 6.4.1.3.3.1 of [1].
$m_{cs} = 0$ except for PUCCH format 0 and/or PUCCH format 1 when it depends on the information to be transmitted according to clause 9.2 of [2].

$m_{int}$ is given by $m_{int} = 5n_{IRB}^\mu$ for PUCCH formats 0 and 1 if PUCCH shall use interlaced mapping according to any of the higher-layer parameters useInterlacePUCCH-PUSCH in BWP-UplinkCommon or useInterlacePUCCH-PUSCH in BWP-UplinkDedicated, where $n_{IRB}^\mu$ is the resource block number within the interlace;

$m_{int} = 0$ otherwise

The function $n_{cs}(n_c, l)$ is given by $$n_{cs}(n_{s,f}^\mu, l) = \sum_{m=0}^{7} 2^m c(8N_{symb}^{slot} n_{s,f}^\mu + 8l + m)$$

where the pseudo-random sequence c(i) is defined by clause 5.2.1 of [1]. The pseudo-random sequence generator shall be initialized with $c_{init} = n_{ID}$, where $n_{ID}$ is given by the higher-layer parameter hoppingId if configured, otherwise $n_{ID} = N_{ID}^{cell}$.

III.3 PUCCH Format 0
III.3.1 Sequence Generation

The sequence x(n) shall be generated according to:

$x(l \cdot N_{sc}^{RB} + n) = r_{u,v}^{(\alpha,\delta)}(n)$ $n = 0, 1, \ldots, N_{sc}^{RB} - 1$ $l = \{0, 1 \text{ for double-symbolPUCCHtransmission}}^{0 \text{ for single-symbolPUCCHtransmission}}$ where $r_{u,v}^{(\alpha,\delta)}(n)$ is given by clause III.2 or clause 6.3.2.2 of [1] with $m_{cs}$ depending on the information to be transmitted according to clause 9.2 of [2].

III.3.2 Mapping to Physical Resources

The sequence x(n) shall be multiplied with the amplitude scaling factor $\beta_{PUCCH,0}$ in order to conform to the transmit power specified in [2] and mapped in sequence starting with x(0) to resource elements $(k, l)_{p,\mu}$ assigned for transmission according to clause 9.2.1 of [2] in increasing order of first the index k over the assigned physical resources spanning one resource block, and then the index l on antenna port p=2000

For interlaced transmission, the mapping operation shall be repeated for each resource block in the interlace and in the active bandwidth part over the assigned physical resource blocks according to clause 9.2.1 of [2], with the resource-block dependent sequence generated according to clause III.2 or clause 6.3.2.2 of [1].

III.4 PUCCH Format 1
III.4.1 Sequence Modulation

The block of bits $b(0), \ldots, b(M_{bit} - 1)$ shall be modulated as described in clause 5.1 of [1] using BPSK if $M_{bit} = 1$ and QPSK if $M_{bit} = 2$, resulting in a complex-valued symbol d(0) The complex-valued symbol d(0) shall be multiplied with a sequence $r_{u,v}^{(\alpha,\delta)}(n)$ according to $y(n) = d(0) \cdot r_{u,v}^{(\alpha,\delta)}(n)$ $n = 0, 1, \ldots, N_{sc}^{RB} - 1$ where $r_{u,v}^{(\alpha,\delta)}(n)$ is given by clause III.2 or clause 6.3.2.2 of [1]. The block of complex-valued symbols $y(0), \ldots, y(N_{sc}^{RB} - 1)$ shall be block-wise spread with the orthogonal sequence $w_i(m)$ according to $$z(m' N_{sc}^{RB} N_{SF,0}^{PUCCH,1} + m N_{sc}^{RB} + n) = w_i(m) \cdot y(n)$$

$n = 0, 1, \ldots, N_{sc}^{RB} - 1$ $m = 0, 1, \ldots, N_{SF,m'}^{PUCCH,1} - 1$ $m' = \{0, 1 \text{ intra-slot frequency hopping enabled}}^{0 \text{ no intra-slot frequency hopping}}$ where $N_{SF,m'}^{PUCCH,1}$ is given by Table III.4-1-1 or Table 6.3.2.4.1-1 in [1]. Intra-slot frequency hopping shall be assumed when the higher-layer parameter intraSlotFrequencyHopping is provided, regardless of whether the frequency-hop distance is zero or not, and interlaced mapping is not enabled, otherwise no intra-slot frequency hopping shall be assumed.

The orthogonal sequence $w_i(m)$ is given by Table III.4-1-2 or Table 6.3.2.4.1-2 of [1] where i is the index of the orthogonal sequence to use according to clause 9.2.1 of [2]. In case of a PUCCH transmission spanning multiple slots according to clause 9.2.6 of [2], the complex-valued symbol d(0) is repeated for the subsequent slots.

TABLE III.4.1-1

Number of PUCCH symbols and the corresponding $N_{SF,m'}^{PUCCH,1}$.

| | $N_{SF,m'}^{PUCCH,1}$ | | |
|---|---|---|---|
| PUCCH length, | No intra-slot hopping | Intra-slot hopping | |
| $N_{symb}^{PUCCH,1}$ | m' = 0 | m' = 0 | m' = 1 |
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 3 |
| 12 | 6 | 3 | 3 |
| 13 | 6 | 3 | 3 |
| 14 | 7 | 3 | 4 |

TABLE III.4.1-2

Orthogonal sequences $w_i(m) = e^{j2\pi\phi(m)/N_{SF,m'}^{PUCCH,1}}$ for PUCCH format 1.

| $N_{SF,m'}^{PUCCH,1}$ | i = 0 | i = 1 | i = 2 | i = 3 | i = 4 | i = 5 | i = 6 |
|---|---|---|---|---|---|---|---|
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

III.4.2 Mapping to Physical Resources

The sequence z(n) shall be multiplied with the amplitude scaling factor $\beta_{PUCCH,1}$ in order to conform to the transmit power specified in [2] and mapped in sequence starting with z(n) to resource elements $(k, l)_{p,\mu}$ which meet all of the following criteria:

they are in the resource blocks assigned for transmission according to clause 9.2.1 of [2], they are not used by the associated DM-RS The mapping to resource elements $(k, l)_{p,\mu}$ not reserved for other purposes shall be in increasing order of first the index k over the assigned physical resource block, and then the index l on antenna port p=2000

For interlaced transmission, the mapping operation shall be repeated for each resource block in the interlace and in the active bandwidth part over the assigned physical resource blocks according to clause 9.2.1 of [2], with the resource-block dependent sequence generated according to clause III.2 or clause 6.3.2.2 of [1].

III.5 PUCCH Format 2

III.5.1 Scrambling

The block of bits $b(0), \ldots, b(M_{bit}-1)$, where $M_{bit}$ is the number of bits transmitted on the physical channel, shall be scrambled prior to modulation, resulting in a block of scrambled bits $\tilde{b}(0), \ldots, \tilde{b}(M_{bit}-1)$ according to $$\tilde{b}(i)=(b(i)+c(i)) \bmod 2$$

where the scrambling sequence $c^{(q)}(i)$ is given by clause 5.2.1 of [1]. The scrambling sequence generator shall be initialized with $$c_{init}=n_{RNTI} 2^{15}+n_{ID}$$

where $n_{ID} \in \{0,1,\ldots,1023\}$ equals the higher-layer parameter dataScramblingIdentityPUSCH if configured, $n_{ID}=N_{ID}^{cell}$ otherwise and $n_{RNTI}$ is given by the C-RNTI.

III.5.2 Modulation

The block of scrambled bits $\tilde{b}(0), \ldots, \tilde{b}(M_{bit}-1)$ shall be modulated as described in clause 5.1 of [1] using QPSK, resulting in a block of complex-valued modulation symbols $d(0), \ldots, d(M_{symb}-1)$ where $M_{symb}=M_{bit}/2$.

III.5.2A Spreading

Spreading shall be applied according to $$z(mN_{SF}^{PUCCH,2}+i)=w_n(i)d(m)$$

i=0,1 ... $N_{SF}^{PUCCH,2}-1$ m=0,1, ..., $M_{symb}-1$ resulting in a block of complex-valued symbols $z(0), \ldots, z(N_{SF}^{PUCCH,2}M_{symb}-1)$.

If the higher layer parameter interlace1 is not configured, and the higher-layer parameter OCC-Length-r16 is configured, $N_{SF}^{PUCCH,2} \in \{2,4\}$ is given by the higher-layer parameter OCC-Length-r16;

$w_n(i)$ is given by Tables III.5A-1 and III.5A-2 (or Tables 6.3.2.5A-1 and 6.3.2.5A-2 of [1]) where $n=(n_0+n_{IRB}) \bmod N_{SF}^{PUCCH,2}$, the quantity $n_0$ is the index of the orthogonal sequence to use given by the higher-layer parameter OCC-Index-r16, and $n_{IRB}$ is the interlaced resource block number as defined in clause 4.4.4.6 of [1] within the interlace given by the higher-layer parameter Interlace0.

otherwise $N_{SF}^{PUCCH,2}=1$ and $w_n(i)=1$.

Table III.5A-1: Orthogonal sequences $w_n(i)$ for PUCCH format 2 when $N_{SF}^{PUCCH,2}=2$.

n $w_n(i)$
0 [+1 +1]
1 [+1 −1]

Table III.5A-2: Orthogonal sequences $w_n(i)$ for PUCCH format 2 when $N_{SF}^{PUCCH,2}=4$.

n $w_n(i)$
0 [+1 +1 +1 +1]
1 [+1 −1 +1 −1]
2 [+1 +1 −1 −1]
3 [+1 −1 −1 +1]

III.5.3 Mapping to Physical Resources

The block of complex-valued symbols $z(0), \ldots, z(N_{SF}^{PUCCH,2}M_{symb}-1)$ shall be multiplied with the amplitude scaling factor $\beta_{PUCCH,2}$ in order to conform to the transmit power specified in [2] and mapped in sequence starting with z(0) to resource elements $(k, l)_{p,\mu}$ which meet all of the following criteria:

they are in the resource blocks assigned for transmission, they are not used by the associated DM-RS.

The mapping to resource elements $(k, l)_{p,\mu}$ not reserved for other purposes shall be in increasing order of first the index k over the assigned physical resource blocks according to clause 9.2.1 of [2], and then the index l on antenna port p=2000

III.6 PUCCH Formats 3 and 4

III.6.1 Scrambling

The block of bits $b(0), \ldots, b(M_{bit}-1)$, where $M_{bit}$ is the number of bits transmitted on the physical channel, shall be scrambled prior to modulation, resulting in a block of scrambled bits $\tilde{b}(0), \ldots, \tilde{b}(M_{bit}-1)$ according to $$\tilde{b}(i)=(b(i)+c(i)) \bmod 2$$

where the scrambling sequence c(i) is given by clause 5.2.1 of [1]. The scrambling sequence generator shall be initialized with $$c_{init}=n_{RNTI} 2^{15}+n_{ID}$$

where $n_{ID} \in \{0,1,\ldots,1023\}$ equals the higher-layer parameter dataScramblingIdentityPUSCH if configured, $n_{ID}=N_{ID}^{cell}$ otherwise and $n_{RNTI}$ is given by the C-RNTI.

III.6.2 Modulation

The block of scrambled bits $\tilde{b}(0), \ldots, \tilde{b}(M_{bit}-1)$ shall be modulated as described in clause 5.1 of [1] using QPSK unless π/2-BPSK is configured, resulting in a block of complex-valued modulation symbols $d(0), \ldots, d(M_{symb}-1)$ where $M_{symb}=M_{bit}/2$ for QPSK and $M_{symb}=M_{bit}$ for π/2-BPSK.

III.6.3 Block-Wise Spreading

For both PUCCH format 3 and 4, $M_{sc}^{PUCCH,s}=M_{RB}^{PUCCH,s}N_{sc}^{RB}$ with $M_{RB}^{PUCCH,s}$ representing the bandwidth of the PUCCH in terms of resource blocks according to clauses 9.2.3, 9.2.5.1 and 9.2.5.2 of [2] and shall for non-interlaced mapping fulfil $$M_{RB}^{PUCCH,s} = \begin{cases} 2^{\alpha_2} \cdot 3^{\alpha_3} \cdot 5^{\alpha_5} & \text{for PUCCH format 3} \\ 1 & \text{for PUCCH format 4} \end{cases}$$

where $\alpha_2, \alpha_3, \alpha_5$ is a set of non-negative integers and $s \in \{3,4\}$. For interlaced mapping, $M_{RB}^{PUCCH,3}=10$ if a single interlace is configured and $M_{RB}^{PUCCH,2}=20$ if two interlaces are configured.

For PUCCH format 3, if interlaced mapping is not configured, no block-wise spreading is applied and $$y(lM_{sc}^{PUCCH,3}+k)=d(lM_{sc}^{PUCCH,3}+k)$$

$k=0,1,\ldots,M_{sc}^{PUCCH,3}-1$ $l=0,1,\ldots,(M_{symb}/M_{sc}^{PUCCH,3})-1$ where $M_{RB}^{PUCCH,3} \geq 1$ is given by clauses 9.2.3, 9.2.5.1 and 9.2.5.2 of [2] and $N_{SF}^{PUCCH,3}=1$.

For PUCCH format 3 with interlaced mapping and PUCCH format 4, block-wise spreading shall be applied according to $$y(lM_{sc}^{PUCCH,s}+k)=w_n\left(\left\lfloor k\frac{N_{SF}^{PUCCH,s}}{M_{sc}^{PUCCH,s}}\right\rfloor\right)d\left(l\frac{M_{sc}^{PUCCH,s}}{N_{SF}^{PUCCH,s}}+k\bmod\frac{M_{sc}^{PUCCH,s}}{N_{SF}^{PUCCH,s}}\right)$$

$$k=0,1,\ldots,M_{sc}^{PUCCH,s}-1$$

$$l=0,1,\ldots,\left(N_{SF}^{PUCCH,s}M_{symb}/M_{sc}^{PUCCH,s}\right)-1$$

where for PUCCH format 3 with interlaced mapping, $N_{SF}^{PUCCH,3}\in\{1,2,4\}$ if a single interlace is configured and $N_{SF}^{PUCCH,3}=1$, $w_n=1$ if two interlaces are configured;

for PUCCH format 4, $N_{RB}^{PUCCH,4}=1$, $N_{SF}^{PUCCH,4}\in\{2,4\}$; and $w_n$ is given by Tables III.6.3-1 and III.6.3-2 (or Tables 6.3.2.6.3-1 and 6.3.2.6.3-2 of [1]) for $N_{SF}^{PUCCH,s}>1$ where n is the index of the orthogonal sequence to use according to clause 9.2.1 of [2].

TABLE III.6.3-1

Orthogonal sequences $w_n^{(m)}$ for PUCCH format 3 with interlaced mapping and PUCCH format 4 when $N_{SF}^{PUCCH,s}=2$.

| n | $w_n$ |
|---|---|
| 0 | [+1 +1] |
| 1 | [+1 −1] |

TABLE III.6.3-2

Orthogonal sequences $w_n^{(m)}$ for PUCCH format 3 with interlaced mapping and PUCCH format 4 when $N_{SF}^{PUCCH,s}=4$

| n | $w_n$ |
|---|---|
| 0 | [+1 +1 +1 +1] |
| 1 | [+1 −j −1 +j] |
| 2 | [+1 −1 +1 −1] |
| 3 | [+1 +j −1 −j] |

III.6.4 Transform Precoding

The block of complex-valued symbols y(0), . . . , $y(N_{SF}^{PUCCH,s}M_{symb}-1)$ shall be transform precoded according to $$z(l\cdot M_{sc}^{PUCCH,s}+k)=$$

$$\frac{1}{\sqrt{M_{sc}^{PUCCH,s}}}\sum_{m=0}^{M_{sc}^{PUCCH,s}-1}y(l\cdot M_{sc}^{PUCCH,s}+m)e^{-j\frac{2\pi mk}{M_{sc}^{PUCCH,s}}}$$

$$k=0,\ldots,M_{sc}^{PUCCH,s}-1$$

$$l=0,\ldots,\left(N_{SF}^{PUCCH,s}M_{symb}/M_{sc}^{PUCCH,s}\right)-1$$

resulting in a block of complex-valued symbols z(0), . . . , $z(N_{SF}^{PUCCH,s}M_{symb}-1)$.

III.6.5 Mapping to Physical Resources

The block of modulation symbols z(0), . . . , $z(N_{SF}^{PUCCH,s}M_{symb}-1)$ shall be multiplied with the amplitude scaling factor $\beta_{PUCCH,s}$ in order to conform to the transmit power specified in [2] and mapped in sequence starting with z(0) to resource elements $(k,l)_{p,\mu}$ which meet all of the following criteria: they are in the resource blocks assigned for transmission, they are not used by the associated DM-RS The mapping to resource elements $(k,l)_{p,\mu}$ not reserved for other purposes shall be in increasing order of first the index k over the assigned physical resource blocks according to clause 9.2.1 of [2], and then the index l on antenna port p=2000.

In case of intra-slot frequency hopping according to clause 9.2.1 of $\lfloor N_{symb}^{PUCCH,s}/2\rfloor$ OFDM symbols shall be transmitted in the first hop and $N_{symb}^{PUCCH,s}-\lfloor N_{symb}^{PUCCH,s}/2\rfloor$ symbols in the second hop where $N_{symb}^{PUCCH,s}$ is the total number of OFDM symbols used in one slot for PUCCH transmission.

Systems and Implementations

Figure 8:
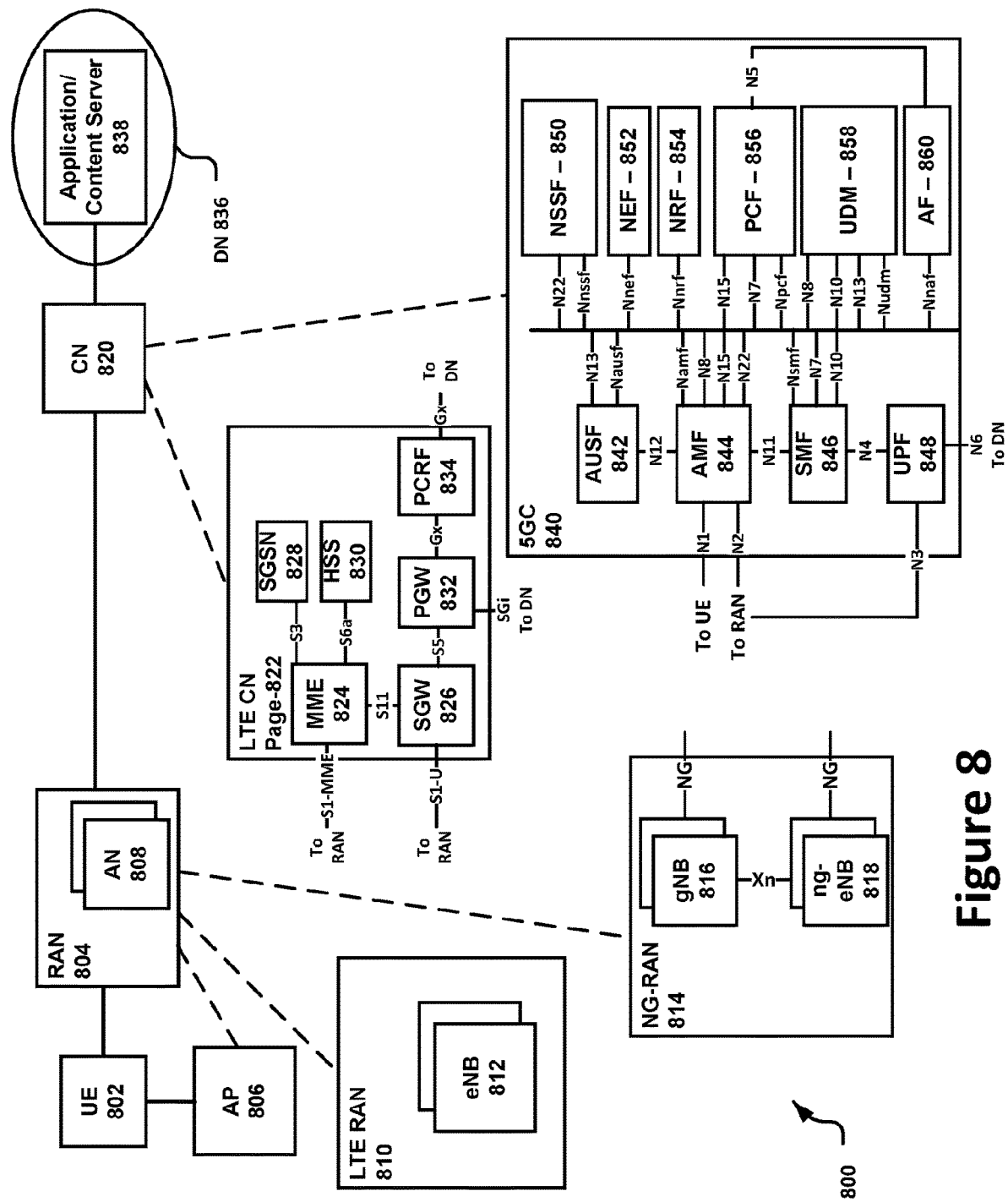
FIG. 8 illustrates a network in accordance with various embodiments.
Figure 9:
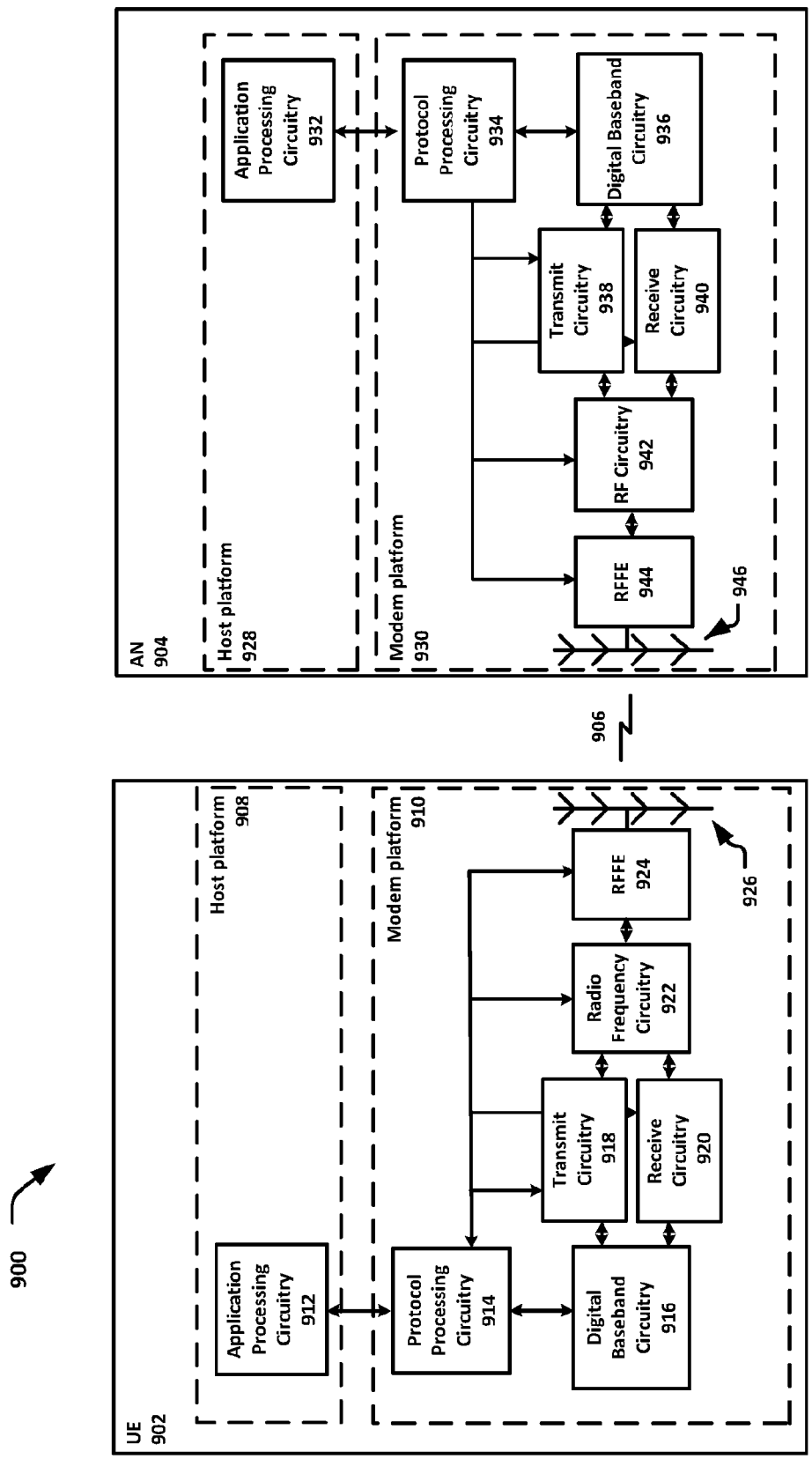
FIG. 9 schematically illustrates a wireless network in accordance with various embodiments.
Figure 10:
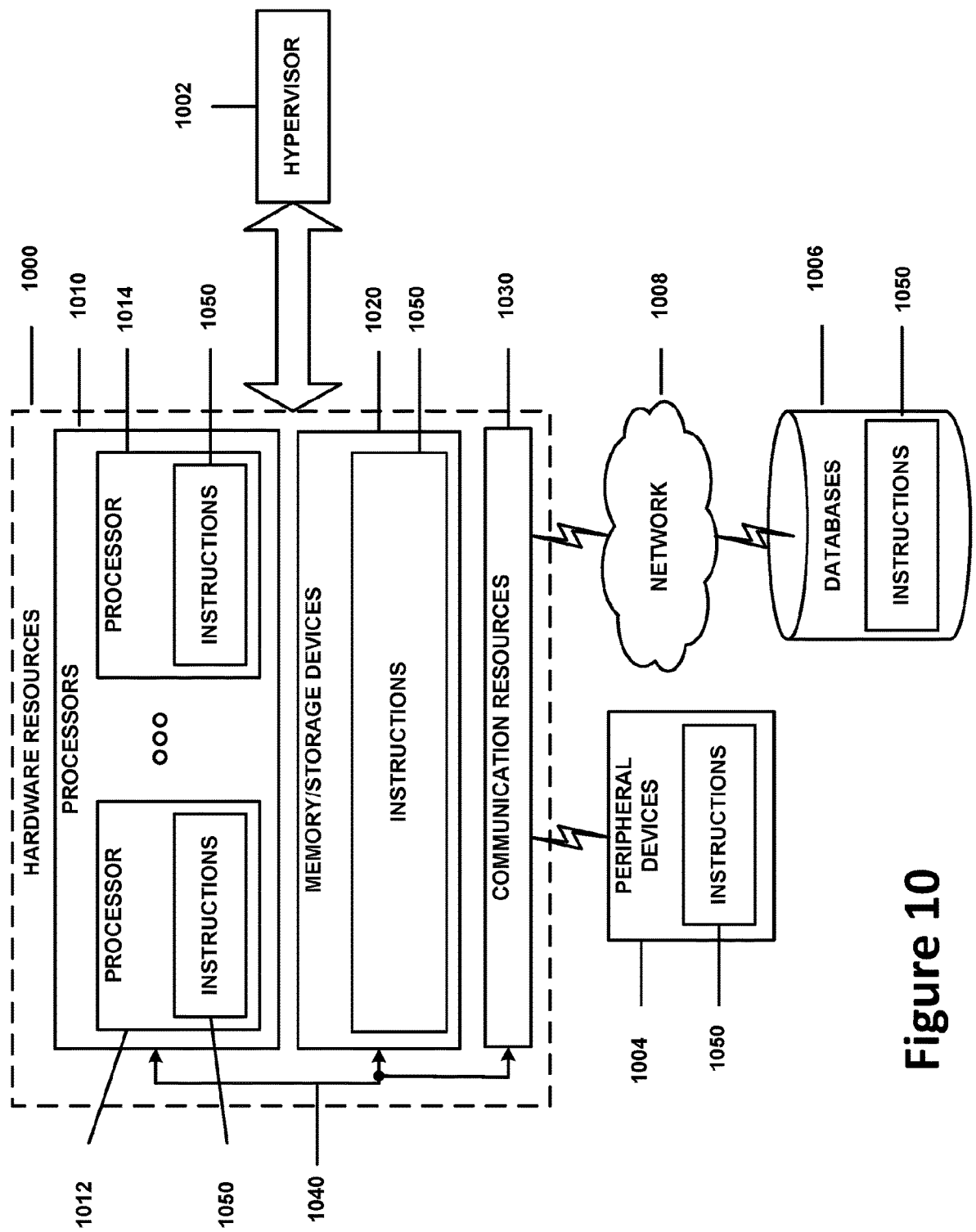
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 8-10 illustrate various systems, devices, and components that may implement aspects of disclosed embodiments.

FIG. 8 illustrates a network 800 in accordance with various embodiments. The network 800 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 800 may include a UE 802, which may include any mobile or non-mobile computing device designed to communicate with a RAN 804 via an over-the-air connection. The UE 802 may be communicatively coupled with the RAN 804 by a Uu interface. The UE 802 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 800 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 802 may additionally communicate with an AP 806 via an over-the-air connection. The AP 806 may manage a WLAN connection, which may serve to offload some/all network traffic from the RAN 804. The connection between the UE 802 and the AP 806 may be consistent with any IEEE 802.11 protocol, wherein the AP 806 could be a wireless fidelity (Wi-Fi®) router. In some embodiments, the UE 802, RAN 804, and AP 806 may utilize cellular-WLAN aggregation (for example, LWA/LWIP). Cellular-WLAN aggregation may involve the UE 802 being configured by the RAN 804 to utilize both cellular radio resources and WLAN resources.

The RAN 804 may include one or more access nodes, for example, AN 808. AN 808 may terminate air-interface protocols for the UE 802 by providing access stratum protocols including RRC, PDCP, RLC, MAC, and L1 protocols. In this manner, the AN 808 may enable data/voice connectivity between CN 820 and the UE 802. In some embodiments, the AN 808 may be implemented in a discrete device or as one or more software entities running on server computers as part of, for example, a virtual network, which may be referred to as a CRAN or virtual baseband unit pool. The AN 808 be referred to as a BS, gNB, RAN node, eNB, ng-eNB, NodeB, RSU, TRxP, TRP, etc. The AN 808 may be a macrocell base station or a low power base station for providing femtocells, picocells or other like cells having smaller coverage areas, smaller user capacity, or higher bandwidth compared to macrocells.

In embodiments in which the RAN 804 includes a plurality of ANs, they may be coupled with one another via an X2 interface (if the RAN 804 is an LTE RAN) or an Xn interface (if the RAN 804 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 804 may each manage one or more cells, cell groups, component carriers, etc. to provide the UE 802 with an air interface for network access. The UE 802 may be simultaneously connected with a plurality of cells provided by the same or different ANs of the RAN 804. For example, the UE 802 and RAN 804 may use carrier aggregation to allow the UE 802 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 804 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 802 or AN 808 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/ software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 804 may be an LTE RAN 810 with eNBs, for example, eNB 812. The LTE RAN 810 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 804 may be an NG-RAN 814 with gNBs, for example, gNB 816, or ng-eNBs, for example, ng-eNB 818. The gNB 816 may connect with 5G-enabled UEs using a 5G NR interface. The gNB 816 may connect with a 5G core through an NG interface, which may include an N2 interface or an N3 interface. The ng-eNB 818 may also connect with the 5G core through an NG interface, but may connect with a UE via an LTE air interface. The gNB 816 and the ng-eNB 818 may connect with each other over an Xn interface.

In some embodiments, the NG interface may be split into two parts, an NG user plane (NG-U) interface, which carries traffic data between the nodes of the NG-RAN 814 and a UPF 848 (e.g., N3 interface), and an NG control plane (NG-C) interface, which is a signaling interface between the nodes of the NG-RAN 814 and an AMF 844 (e.g., N2 interface).

The NG-RAN 814 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 802 can be configured with multiple BWPs where each BWP configuration has a different SCS. When a BWP change is indicated to the UE 802, the SCS of the transmission is changed as well. Another use case example of BWP is related to power saving. In particular, multiple BWPs can be configured for the UE 802 with different amount of frequency resources (for example, PRBs) to support data transmission under different traffic loading scenarios. A BWP containing a smaller number of PRBs can be used for data transmission with small traffic load while allowing power saving at the UE 802 and in some cases at the gNB 816. A BWP containing a larger number of PRBs can be used for scenarios with higher traffic load.

The RAN 804 is communicatively coupled to CN 820 that includes network elements to provide various functions to support data and telecommunications services to customers/ subscribers (for example, users of UE 802). The components of the CN 820 may be implemented in one physical node or separate physical nodes. In some embodiments, NFV may be utilized to virtualize any or all of the functions provided by the network elements of the CN 820 onto physical compute/storage resources in servers, switches, etc. A logical instantiation of the CN 820 may be referred to as a network slice, and a logical instantiation of a portion of the CN 820 may be referred to as a network sub-slice.

In some embodiments, the CN 820 may be an LTE CN 822, which may also be referred to as an EPC. The LTE CN 822 may include MME 824, SGW 826, SGSN 828, HSS 830, PGW 832, and PCRF 834 coupled with one another over interfaces (or "reference points") as shown. Functions of the elements of the LTE CN 822 may be briefly introduced as follows.

The MME 824 may implement mobility management functions to track a current location of the UE 802 to facilitate paging, bearer activation/deactivation, handovers, gateway selection, authentication, etc.

The SGW 826 may terminate an S1 interface toward the RAN and route data packets between the RAN and the LTE CN 822. The SGW 826 may be a local mobility anchor point for inter-RAN node handovers and also may provide an anchor for inter-3GPP mobility. Other responsibilities may include lawful intercept, charging, and some policy enforcement.

The SGSN 828 may track a location of the UE 802 and perform security functions and access control. In addition, the SGSN 828 may perform inter-EPC node signaling for mobility between different RAT networks; PDN and S-GW selection as specified by MME 824; MME selection for handovers; etc. The S3 reference point between the MME 824 and the SGSN 828 may enable user and bearer information exchange for inter-3GPP access network mobility in idle/active states.

The HSS 830 may include a database for network users, including subscription-related information to support the network entities' handling of communication sessions. The HSS 830 can provide support for routing/roaming, authentication, authorization, naming/addressing resolution, location dependencies, etc. An S6a reference point between the HSS 830 and the MME 824 may enable transfer of subscription and authentication data for authenticating/authorizing user access to the LTE CN 820.

The PGW 832 may terminate an SGi interface toward a data network (DN) 836 that may include an application/content server 838. The PGW 832 may route data packets between the LTE CN 822 and the data network 836. The PGW 832 may be coupled with the SGW 826 by an S5 reference point to facilitate user plane tunneling and tunnel management. The PGW 832 may further include a node for policy enforcement and charging data collection (for example, PCEF). Additionally, the SGi reference point between the PGW 832 and the data network 836 may be an operator external public, a private PDN, or an intra-operator packet data network, for example, for provision of IMS services. The PGW 832 may be coupled with a PCRF 834 via a Gx reference point.

The PCRF 834 is the policy and charging control element of the LTE CN 822. The PCRF 834 may be communicatively coupled to the app/content server 838 to determine appropriate QoS and charging parameters for service flows. The PCRF 832 may provision associated rules into a PCEF (via Gx reference point) with appropriate TFT and QCI.

In some embodiments, the CN 820 may be a 5GC 840. The 5GC 840 may include an AUSF 842, AMF 844, SMF 846, UPF 848, NSSF 850, NEF 852, NRF 854, PCF 856, UDM 858, and AF 860 coupled with one another over interfaces (or "reference points") as shown. Functions of the elements of the 5GC 840 may be briefly introduced as follows.

The AUSF 842 may store data for authentication of UE 802 and handle authentication-related functionality. The AUSF 842 may facilitate a common authentication framework for various access types. In addition to communicating with other elements of the 5GC 840 over reference points as shown, the AUSF 842 may exhibit an Nausf service-based interface.

The AMF 844 may allow other functions of the 5GC 840 to communicate with the UE 802 and the RAN 804 and to subscribe to notifications about mobility events with respect to the UE 802. The AMF 844 may be responsible for registration management (for example, for registering UE 802), connection management, reachability management, mobility management, lawful interception of AMF-related events, and access authentication and authorization. The AMF 844 may provide transport for SM messages between the UE 802 and the SMF 846, and act as a transparent proxy for routing SM messages. AMF 844 may also provide transport for SMS messages between UE 802 and an SMSF. AMF 844 may interact with the AUSF 842 and the UE 802 to perform various security anchor and context management functions. Furthermore, AMF 844 may be a termination point of a RAN CP interface, which may include or be an N2 reference point between the RAN 804 and the AMF 844; and the AMF 844 may be a termination point of NAS (N1) signaling, and perform NAS ciphering and integrity protection. AMF 844 may also support NAS signaling with the UE 802 over an N3 IWF interface.

The SMF 846 may be responsible for SM (for example, session establishment, tunnel management between UPF 848 and AN 808); UE IP address allocation and management (including optional authorization); selection and control of UP function; configuring traffic steering at UPF 848 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 844 over N2 to AN 808; and determining SSC mode of a session. SM may refer to management of a PDU session, and a PDU session or "session" may refer to a PDU connectivity service that provides or enables the exchange of PDUs between the UE 802 and the data network 836.

The UPF 848 may act as an anchor point for intra-RAT and inter-RAT mobility, an external PDU session point of interconnect to data network 836, and a branching point to support multi-homed PDU session. The UPF 848 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 848 may include an uplink classifier to support routing traffic flows to a data network.

The NSSF 850 may select a set of network slice instances serving the UE 802. The NSSF 850 may also determine allowed NSSAI and the mapping to the subscribed S-NSSAIs, if needed. The NSSF 850 may also determine the AMF set to be used to serve the UE 802, or a list of candidate AMFs based on a suitable configuration and possibly by querying the NRF 854. The selection of a set of network slice instances for the UE 802 may be triggered by the AMF 844 with which the UE 802 is registered by interacting with the NSSF 850, which may lead to a change of AMF. The NSSF 850 may interact with the AMF 844 via an N22 reference point; and may communicate with another NSSF in a visited network via an N31 reference point (not shown). Additionally, the NSSF 850 may exhibit an Nnssf service-based interface.

The NEF 852 may securely expose services and capabilities provided by 3GPP network functions for third party, internal exposure/re-exposure, AFs (e.g., AF 860), edge computing or fog computing systems, etc. In such embodiments, the NEF 852 may authenticate, authorize, or throttle the AFs. NEF 852 may also translate information exchanged with the AF 860 and information exchanged with internal network functions. For example, the NEF 852 may translate between an AF-Service-Identifier and an internal 5GC information. NEF 852 may also receive information from other NFs based on exposed capabilities of other NFs. This information may be stored at the NEF 852 as structured data, or at a data storage NF using standardized interfaces. The stored information can then be re-exposed by the NEF 852 to other NFs and AFs, or used for other purposes such as analytics. Additionally, the NEF 852 may exhibit an Nnef service-based interface.

The NRF 854 may support service discovery functions, receive NF discovery requests from NF instances, and provide the information of the discovered NF instances to the NF instances. NRF 854 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 854 may exhibit the Nnrf service-based interface.

The PCF 856 may provide policy rules to control plane functions to enforce them, and may also support unified policy framework to govern network behavior. The PCF 856 may also implement a front end to access subscription information relevant for policy decisions in a UDR of the UDM 858. In addition to communicating with functions over reference points as shown, the PCF 856 exhibit an Npcf service-based interface.

The UDM 858 may handle subscription-related information to support the network entities' handling of communication sessions, and may store subscription data of UE 802. For example, subscription data may be communicated via an N8 reference point between the UDM 858 and the AMF 844. The UDM 858 may include two parts, an application front end and a UDR. The UDR may store subscription data and policy data for the UDM 858 and the PCF 856, and/or structured data for exposure and application data (including PFDs for application detection, application request information for multiple UEs 802) for the NEF 852. The Nudr service-based interface may be exhibited by the UDR 221 to allow the UDM 858, PCF 856, and NEF 852 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 858 may exhibit the Nudm service-based interface.

The AF 860 may provide application influence on traffic routing, provide access to NEF, and interact with the policy framework for policy control.

In some embodiments, the 5GC 840 may enable edge computing by selecting operator/$3^{rd}$ party services to be geographically close to a point that the UE 802 is attached to the network. This may reduce latency and load on the network. To provide edge-computing implementations, the 5GC 840 may select a UPF 848 close to the UE 802 and execute traffic steering from the UPF 848 to data network 836 via the N6 interface. This may be based on the UE subscription data, UE location, and information provided by the AF 860. In this way, the AF 860 may influence UPF (re)selection and traffic routing. Based on operator deployment, when AF 860 is considered to be a trusted entity, the network operator may permit AF 860 to interact directly with relevant NFs. Additionally, the AF 860 may exhibit an Naf service-based interface.

The data network 836 may represent various network operator services, Internet access, or third party services that may be provided by one or more servers including, for example, application/content server 838.

FIG. 9 schematically illustrates a wireless network 900 in accordance with various embodiments. The wireless network 900 may include a UE 902 in wireless communication with an AN 904. The UE 902 and AN 904 may be similar to, and substantially interchangeable with, like-named components described elsewhere herein.

The UE 902 may be communicatively coupled with the AN 904 via connection 906. The connection 906 is illustrated as an air interface to enable communicative coupling, and can be consistent with cellular communications protocols such as an LTE protocol or a 5G NR protocol operating at mmWave or sub-6 GHz frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040 or other interface circuitry. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processors 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface controllers, components, or other suitable devices to communicate with one or more peripheral devices 1004 or one or more databases 1006 or other network elements via a network 1008. For example, the communication resources 1030 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Example Procedures

Figure 11:
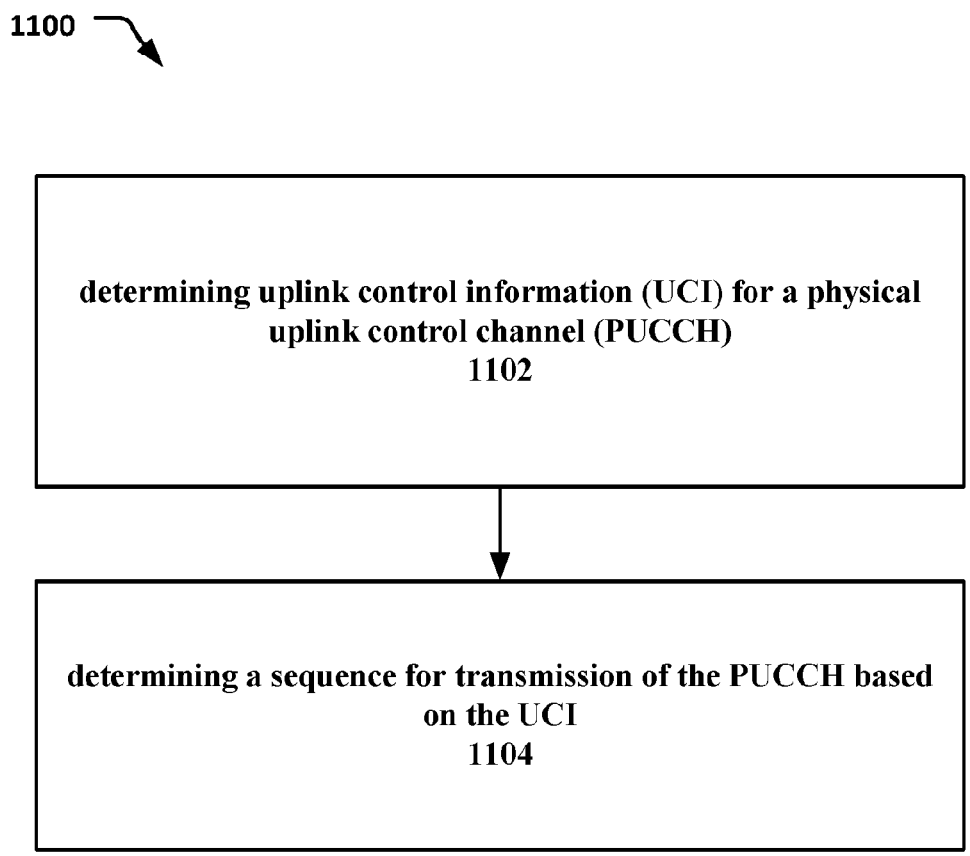

In some embodiments, the electronic device(s), network(s), system(s), chip(s) or component(s), or portions or implementations thereof, of FIGS. 8-10, or some other figure herein, may be configured to perform one or more processes, techniques, or methods as described herein, or portions thereof. One such process 1100 is depicted in FIG. 11. For example, the process 1100 may include, at 1102, determining uplink control information (UCI) for a physical uplink control channel (PUCCH). In some embodiments, the PUCCH may have a PUCCH format 1, 3, or 4.

At 1104, the process 1100 may further include determining a sequence for transmission of the PUCCH based on the UCI. For example, the sequence may be determined based on a payload of the UCI. In some embodiments, the sequence may be determined from a plurality of orthogonal sequences. The plurality of sequences may be associated with a group identity. In some embodiments, the sequences may include different root indexes and/or cyclic prefixes. In some embodiments, the sequences may be Zadoff-Chu (ZC) sequences.

In various embodiments, the process 1100 may be performed by a UE or a portion thereof (e.g., baseband circuitry of the UE).

FIG. 12 illustrates another process 1200 in accordance with various embodiments. The process 1200 may be performed by a UE or a portion thereof. The process 1200 may include, at 1202, determining uplink control information (UCI) payload information for a physical uplink control channel (PUCCH) with a PUCCH format 1.

At 1204, the process 1200 may further include determining a sequence for transmission of the PUCCH based on the UCI payload information. At 1206, the process 1200 may further include mapping the determined sequence to allocated resources for the PUCCH format 1 for transmission.

Figure 13:
Figure 13:

FIG. 13 illustrates another process 1300 in accordance with various embodiments. The process 1300 may be performed by a UE or a portion thereof. The process 1300 may include, at 1302, determining uplink control information (UCI) payload information for a physical uplink control channel (PUCCH) with a PUCCH format 3.

At 1304, the process 1300 may further include initializing a sequence based on some or all of the UCI payload information. At 1306, the process 1300 may further include encoding the PUCCH for transmission based on the initialized sequence.

Figure 14:
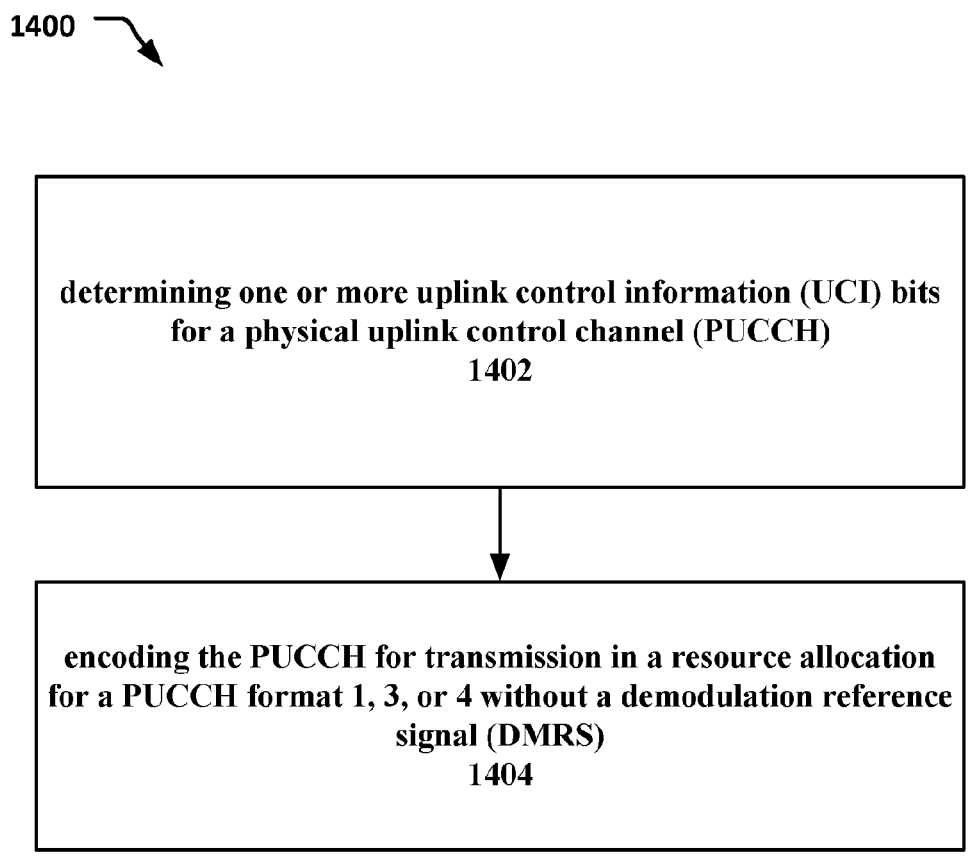

FIG. 14 illustrates another process 1400 in accordance with various embodiments. The process 1400 may be performed by a UE or a portion thereof. At 1402, the process 1400 may include determining one or more uplink control information (UCI) bits for a physical uplink control channel (PUCCH). At 1404, the process 1400 may further include encoding the PUCCH for transmission in a resource allocation for a PUCCH format 1, 3, or 4 without a demodulation reference signal (DMRS).

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Additional examples of the presently described embodiments include the following, non-limiting implementations. Each of the following non-limiting examples may stand on its own or may be combined in any permutation or combination with any one or more of the other examples provided below or throughout the present disclosure.

Example A01 includes a method of wireless communication for a fifth generation (5G) or new radio (NR) system, the method comprising: transmitting, by a user equipment (UE), a physical uplink control channel (PUCCH) format 1 and/or PUCCH format 3 without associated demodulation reference signal (DMRS).

Example A02 includes the method of example A01 and/or some other example(s) herein, wherein for PUCCH format 1 without DMRS, sequence γ(n) assigned to the original data symbols is $r_{u,v}^{(\alpha,\delta)}(n)$ multiplied by d(0) which is from UCI bits; while the sequence γ(n) assigned to the original DMRS symbols is $r_{u,v}^{(\alpha,\delta)}$ multiplied by the conjugated value of d(0).

Example A03 includes the method of example A01 and/or some other example(s) herein, wherein time domain orthogonal cover code (OCC) can be applied on odd/uplink control information (UCI1) and even/UCI0 symbols, respectively, when intra-slot frequency hopping is disabled.

Example A04 includes the method of example A01 and/or some other example(s) herein, wherein when intra-slot frequency hopping is enabled, OCC is applied on odd and even UCI symbols in each hop, respectively.

Example A05 includes the method of example A01 and/or some other example(s) herein, wherein the complex number d(0) may be replaced by a sequence from a sequence set where a sequence is ono-to-one mapping to a value of UCI bit(s).

Example A06 includes the method of example A01 and/or some other example(s) herein, wherein multiple orthogonal sequences can be defined for transmission of PUCCH format 1, wherein different UCI payload is mapped to a sequence from the orthogonal sequences.

Example A07 includes the method of example A01 and/or some other example(s) herein, wherein sequence may be directly mapped to allocated resource for PUCCH format 1.

Example A08 includes the method of example A01 and/or some other example(s) herein, wherein orthogonal sequence can be defined as a combination of length-12 sequence in frequency domain and OCC in time domain.

Example A09 includes the method of example A01 and/or some other example(s) herein, wherein OCC code can be extended to support the length which is larger than 7, wherein OCC code can be generated based on discrete Fourier transform (DFT) based orthogonal code.

Example A10 includes the method of example A01 and/or some other example(s) herein, wherein transmission of sequence based PUCCH format 1 can be partitioned into multiple groups, where each group has not larger than 7 symbols.

Example A11 includes the method of example A01 and/or some other example(s) herein, wherein a UE can be configured with 2 different cyclic shift values in frequency and 2 different OCC indexes in time for 4 orthogonal sequences.

Example A12 includes the method of example A01 and/or some other example(s) herein, wherein for PUCCH format 3, when UCI payload size is less than K bits, after encoding and modulation, the modulated symbols are directly mapped to the allocated resource for PUCCH transmission; wherein K can be predefined in the specification or configured by higher layers via NR remaining minimum system information (RMSI), NR other system information (OSI) or dedicated radio resource control (RRC) signalling.

Example A13 includes the method of example A01 and/or some other example(s) herein, wherein multiple sequences can be defined for transmission of PUCCH format 3, when UCI payload size is less than K bits.

Example A14 includes the method of example A01 and/or some other example(s) herein, wherein multiple long sequences can be generated based on pseudo-random binary sequence (PRBS) of Section 5.2.1 of 3GPP TS 38.211 for PUCCH format 3.

Example A15 includes the method of example A01 and/or some other example(s) herein, wherein initialization seed for the generation of long sequence can be defined as $c_{init}=n_{UCI} 2^{10}+n_{ID}$, wherein $n_{ID} \in \{0,1, \ldots, 1023\}$ is the virtual cell ID, which can be configured by higher layers via RRC signalling, and if not configured, $n_{ID}=N_{ID}^{cell}$; and $n_{UCI}$ is the value of $K_{UCI}$ bits of UCI payload for PUCCH format 3.

Example A16 includes the method of example A01 and/or some other example(s) herein, wherein the initialization seed of the generation of long sequence can be defined as a function of one or more following parameters: Radio Network Temporary Identifier (RNTI), virtual cell ID or scrambling ID, and/or UCI payload information, wherein the initialization seed of the generation of long sequence can be defined as: $c_{init}=c_0 \cdot n_{RNTI}+c_1 \cdot n_{ID}+c_2 \cdot n_{UCI}$, wherein $c_0$, $c_1$ and $c_2$ are predefined in the specification and can be equal to 0 or $2^k$, where k is an integer which is greater than or equal to 0, and different k can be used for $c_0$, $c_1$ and $c_2$; $n_{RNTI}$ is given by Cell RNTI (C-RNTI); $n_{ID} \in \{0,1,\ldots,1023\}$ equals the higher-layer parameter dataScramblingIdentityPUSCH if configured, and $n_{ID}=N_{ID}^{cell}$ otherwise.

Example A17 includes the method of example A01 and/or some other example(s) herein, wherein the initialization seed of the generation of long sequence can be defined as a function of one or more following parameters: Radio Network Temporary Identifier (RNTI), virtual cell ID or scrambling ID, wherein different cyclic shifts based on UCI payload information may be applied for the generation of sequences for new PUCCH format 3.

Example A18 includes the method of example A17 and/or some other example(s) herein, wherein the initialization seed of the generation of long sequence can be defined as $c_{init}=c_0 \cdot n_{RNTI}+c_1 \cdot n_{ID}$.

Example A19 includes the method of example A17 and/or some other example(s) herein, wherein the long sequence for the can be generated as $b(i)=c(i+n_{UCI} \cdot M_{bit})$, wherein $c(\cdot)$ is the sequence which is generated based on the initialization seed in accordance with section 5.2 in 3GPP TS 38.211, b(i) is the sequence for UCI transmission, $M_{bit}$ can be predefined in the specification.

Example A20 includes the method of example A19 and/or some other example(s) herein, wherein $M_{bit}$ can be equal to the number of bits which are mapped to the PUCCH resource when pi/2 BPSK is used.

Example A21 includes the method of example A01 and/or some other example(s) herein, wherein for the new PUCCH format 3, the sequence, either based on a long sequence or a short sequence for each OFDM symbol, can be transmitted using pi/2 BPSK modulation based on DFT-s-OFDM waveform.

Example B01 includes a method comprising: transmitting a physical uplink control channel (PUCCH) transmission using a PUCCH format.

Example B02 includes the method of example B01 and/or some other example(s) herein, wherein the PUCCH format is PUCCH format 1, and BPSK is used as modulation for 1 bit HARQ-ACK feedback and QPSK is used as modulation for 2 bit HARQ-ACK feedback, modulated symbols are multiplied with a length-12 sequence in frequency domain and with orthogonal cover code (OCC), and modulated sequences are directly mapped to an allocated resource configured for PUCCH format 1.

Example B03 includes the method of example B02 and/or some other example(s) herein, wherein the transmitting comprises not transmitting a DMRS on the resource allocated for the PUCCH format 1.

Example B04 includes the method of example B03 and/or some other example(s) herein, wherein for the PUCCH format 1 without DMRS, a sequence γ(n) assigned to original data symbols is $r_{u,v}^{(\alpha,\delta)}(n)$ are multiplied by d(0), wherein d(0) is obtained from uplink control information (UCI) bits, and the sequence γ(n) assigned to original DMRS symbols is $r_{u,v}^{(\alpha,\delta)}$ multiplied by a conjugated value of d(0).

Example B05 includes the method of examples B02-B04 and/or some other example(s) herein, further comprising: applying a time domain orthogonal cover code (OCC) on odd UCI (UCI1) and even UCI (UCI0) symbols when intra-slot frequency hopping is disabled.

Example B06 includes the method of examples B02-B05 and/or some other example(s) herein, further comprising: applying OCC is applied on odd and even UCI symbols in each hop when intra-slot frequency hopping is enabled.

Example B07 includes the method of examples B05-B06 and/or some other example(s) herein, wherein same or different OCC sequence indexes can be configured for the odd UCI and the even UCI symbols for PUCCH format 1, and separate timeDomainOCC is defined when different OCC sequence indexes are configured for odd and even UCI symbols for PUCCH format 1.

Example B08 includes the method of examples B02-B07 and/or some other example(s) herein, further comprising: replacing a complex number d(0) by a sequence from a sequence set, wherein the sequence is one-to-one mapping to a value of UCI bit(s).

Example B09 includes the method of examples B02-B08 and/or some other example(s) herein, wherein multiple orthogonal sequences can be defined for transmission of PUCCH format 1, wherein a different UCI payload is mapped to a sequence from the orthogonal sequences, and/or a sequence may be directly mapped to allocated resource for PUCCH format 1.

Example B10 includes the method of example B09 and/or some other example(s) herein, wherein at least one of the orthogonal sequences is defined as a combination of length-12 sequence in frequency domain and OCC in a time domain.

Example B11 includes the method of examples B02-B09 and/or some other example(s) herein, wherein an OCC code can be extended to support a length that is larger than 7, wherein the OCC code can be generated based on discrete Fourier transform (DFT) based orthogonal code.

Example B12 includes the method of examples B02-B11 and/or some other example(s) herein, wherein transmission of sequence based PUCCH format 1 can be partitioned into multiple groups, wherein each group is not larger than 7 symbols.

Example B13 includes the method of examples B02-B12 and/or some other example(s) herein, further comprising: receiving a configuration having two different cyclic shift values in frequency and two different OCC indexes in time for four orthogonal sequences.

Example B14 includes the method of examples B02-B13 and/or some other example(s) herein, wherein the PUCCH format 1 is replaced with PUCCH format 3 in any of the preceding examples.

Example B15 includes the method of example B01 and/or some other example(s) herein, wherein the PUCCH format is PUCCH format 3, and the method further comprises: after encoding and modulation, directly mapping modulated symbols to an allocated resource for the PUCCH transmission when a UCI payload size is less than K bits.

Example B16 includes the method of examples B01, B15, and/or some other example(s) herein, wherein the PUCCH format is PUCCH format 3, and multiple sequences are defined for transmission of the PUCCH format 3 when a UCI payload size is less than K bits.

Example B17 includes the method of examples B15-B16 and/or some other example(s) herein, wherein K is a predefined value or configured by higher layers via NR remaining minimum system information (RMSI), NR other system information (OSI), or radio resource control (RRC) signalling.

Example B18 includes the method of examples B01, B15-B17, and/or some other example(s) herein, wherein the PUCCH format is PUCCH format 3, and the method further comprises: generating multiple long sequences using Low Peak-to-Average Power Ratio (PAPR) sequence generation type 1 for base sequences of length 36 or larger.

Example B19 includes the method of examples B15-B18 and/or some other example(s) herein, wherein a pseudo-random sequence c(i) of the generated sequences is defined by clause 5.2.1 of 3GPP TS 38.211 for PUCCH format 3.

Example B20 includes the method of example B19 and/or some other example(s) herein, wherein the pseudo-random sequence c(i) is initialized at a beginning of each radio frame with $c_{init}=n_{UCI} \cdot 2^{10}+n_{ID}$, where $n_{ID} \in \{0,1,\ldots,1023\}$ is a virtual cell ID given by a higher layer parameter if configured via RRC signalling or $n_{ID}=N_{ID}^{cell}$ if not configured, and $n_{UCI}$ is the value of $K_{UCI}$ bits of UCI payload for PUCCH format 3.

Example B21 includes the method of examples B01-B20 and/or some other example(s) herein, wherein an initialization seed for generating one or more long sequences is a function of one or more of: Radio Network Temporary Identifier (RNTI), virtual cell ID, scrambling ID, and/or UCI payload information.

Example B22 includes the method of example B21 and/or some other example(s) herein, wherein the initialization seed for generating the one or more long sequences is $c_{init}=c_0 \cdot n_{RNTI}+c_1 \cdot n_{ID}+c_2 \cdot n_{UCI}$, wherein $c_0$, $c_1$ and $c_2$ are 0 or $2^k$, wherein k is an integer which is greater than or equal to 0, and different values of k can be used for $c_0$, $c_1$ and $c_2$; $n_{RNTI}$ is given by Cell RNTI (C-RNTI); $n_{ID} \in \{0,1,\ldots,1023\}$ equals the higher-layer parameter dataScramblingIdentity-PUSCH if configured, and $n_{ID}=N_{ID}^{cell}$ otherwise.

Example B23 includes the method of example B21 and/or some other example(s) herein, wherein different cyclic shifts based on the UCI payload information are applied for generating sequences for a new PUCCH format 3.

Example B24 includes the method of example B23 and/or some other example(s) herein, wherein the initialization seed for generating the one or more long sequences is $c_{init}=c_0 \cdot n_{RNTI}+c_1 \cdot n_{ID}$.

Example B24 includes the method of example B23 and/or some other example(s) herein, wherein the long sequence for the one or more long sequences can be generated as $b(i)=c(i+n_{UCI} \cdot M_{bit})$, wherein $c(\cdot)$ is the sequence which is generated based on the initialization seed in accordance with section 5.2 in 3GPP TS 38.211, b(i) is a sequence for UCI transmission, and $M_{bit}$ is a predefined value.

Example B25 includes the method of example B24 and/or some other example(s) herein, wherein the $M_{bit}$ is equal to a number of bits that are mapped to the PUCCH resource when pi/2 BPSK is used.

Example B26 includes the method of examples B01-B25 and/or some other example(s) herein, wherein a sequence for a new PUCCH format 3 is a long sequence or a short sequence for each OFDM symbol, and the new PUCCH format 3 is to be transmitted using pi/2 BPSK modulation based on DFT-s-OFDM waveform.

Example B27 includes the method of examples B01-B26 and/or some other example(s) herein, wherein the method is performed by a user equipment (UE) or a next generation NodeB (gNB).

Example C1 may include a method of wireless communication for a fifth generation (5G) or new radio (NR) system comprising:
Transmitting, by UE, a sequence representing a uplink control information (UCI) payload information for a physical uplink control channel (PUCCH).

Example C2 may include the method of example C1 or some other example herein, wherein the PUCCH includes PUCCH format 1, 3 and 4.

Example C3 may include the method of example C1 or some other example herein, wherein multiple orthogonal sequences can be defined for transmission of PUCCH format 1; wherein sequence may be directly mapped to allocated resource for PUCCH format 1 without associated DMRS in accordance with UCI payload information.

Example C4 may include the method of example C1 or some other example herein, wherein Zadoff-Chu (ZC) sequences with different root indexes may be used for sequence generation for PUCCH format 1.

Example C5 may include the method of example C1 or some other example herein, wherein assuming UCI payload information as n, the sequence group identity parameter u can be generated as a function of UCI payload information n, where n can be bit {0, 1} for 1 bit UCI payload and bit {0, 1, 2, 3} for 2 bit UCI payload.

Example C6 may include the method of claim C1, wherein Zadoff-Chu (ZC) sequences with different cyclic shifts may be used for sequence generation for PUCCH format 1.

Example C7 may include the method of example C1 or some other example herein, wherein for PUCCH format 3, scrambling sequence may be initialized as a function of partial or full UCI payload information.

Example C8 may include the method of example C1 or some other example herein, wherein following formula can be used for determination of initialization value for scrambling sequence generation for PUCCH format 3:

$$c_{init}=n_{RNTI} \cdot 2^{15}+n_{ID}+F(n)$$

Where n is partial or full UCI payload information, which can be described as decimal value, e.g., $n \in [0 \ldots 2^N-1]$, where N is number of UCI bits.

Example C9 may include the method of example C1 or some other example herein, wherein two scrambling IDs may be configured for PUCCH format 3, where a first scrambling ID may be applied when UCI payload n<N/2 and a second scrambling ID may be applied when UCI payload $$n \geq \frac{N}{2}.$$

Example C10 may include the method of example C1 or some other example herein, wherein after encoding, modulated symbol for PUCCH format 3 may be multiplied by a sequence which depends on UCI payload information.

Example C11 may include the method of example C1 or some other example herein, wherein sequence representing UCI payload information is transmitted on the symbols which are allocated for UCI transmission, wherein DMRS symbols are present in the PUCCH format 3.

Example C12 may include the method of example C1 or some other example herein, wherein the first column for Reed-Muller (RM) code generation may be removed. In this case, the number of input bits can be from 3 to 10 bits.

Example C13 may include a method comprising:
  determining uplink control information (UCI) for a physical uplink control channel (PUCCH); and
  determining a sequence for transmission of the PUCCH based on the UCI.

Example C14 may include the method of example C13 or some other example herein, further comprising mapping the sequence to allocated resources for a PUCCH format without an associated DMRS.

Example C15 may include the method of example C13-C14 or some other example herein, wherein the PUCCH has a PUCCH format 1, 3, or 4.

Example C16 may include the method of example C13-C15 or some other example herein, further comprising determining the sequence from one of a plurality of orthogonal sequences configured for transmission of a PUCCH with a same format.

Example C17 may include the method of example C16, wherein the plurality of orthogonal sequences are associated with respective group identities.

Example C18 may include the method of example C16-C17 or some other example herein, wherein the plurality of sequences include Zadoff-Chu (ZC) sequences with different root indexes.

Example C19 may include the method of example C13-C18 or some other example herein, wherein for UCI payload information n, the sequence group identity parameter u is generated as a function of UCI payload information n, where n is bit {0, 1} for 1 bit UCI payload and bit {0, 1, 2, 3} for 2 bit UCI payload.

Example C20 may include the method of claim C16-C17 or some other example herein, wherein the plurality of sequences include Zadoff-Chu (ZC) sequences with different cyclic shifts.

Example C21 may include the method of example C13-C20 or some other example herein, wherein the sequence is initialized as a function of partial or full UCI payload information of the UCI.

Example C22 may include the method of example C13-C21 or some other example herein, wherein an initialization value for the sequence is determined according to $$c_{init}=n_{RNTI}\cdot2^{15}+n_{ID}+F(n)$$

where n is partial or full UCI payload information of the UCI, which can be described as decimal value, e.g., $n\in[0\ldots 2^N-1]$, where N is number of UCI bits.

Example C23 may include the method of example C13-C22 or some other example herein, further comprising determining the sequence based on a first scrambling ID when UCI payload n<N/2 and based on a second scrambling ID when UCI payload n≥N/2.

Example C24 may include the method of example C13-C23 or some other example herein, further comprising multiplying encoded symbols of the PUCCH by the sequence.

Example C25 may include the method of example C21-C24 or some other example herein, wherein the PUCCH is PUCCH format 3.

Example C26 may include the method of example C21-C25 or some other example herein, further comprising transmitting the PUCCH based on the sequence.

Example C27 may include the method of example C13-C26 or some other example herein, wherein the sequence is transmitted on symbols that are allocated for UCI transmission, wherein DMRS symbols are present in the PUCCH format 3.

Example C28 may include the method of example C13-C27 or some other example herein, wherein the sequence is determined based on the Reed-Muller (RM) code generation table presented herein.

Example C29 may include the method of example C28 or some other example herein, wherein a number of input bits for the sequence is 3 to 10 bits.

Example D1 may include one or more non-transitory, computer-readable media (NTCRM) having instructions, stored thereon, that when executed by one or more processors cause a user equipment (UE) to: determine uplink control information (UCI) payload information for a physical uplink control channel (PUCCH); determine a sequence for transmission of the PUCCH based on the UCI payload information; and encode the PUCCH for transmission based on the determined sequence.

Example D2 may include the one or more NTCRM of example D1, wherein the instructions, when executed, are further to cause the UE to map the sequence to allocated resources for a PUCCH format without an associated demodulation reference signal (DMRS).

Example D3 may include the one or more NTCRM of example D1, wherein to determine the sequence includes to determine a root index of the sequence based on the UCI payload information.

Example D4 may include the one or more NTCRM of example D1, wherein to determine the sequence includes to determine a cyclic prefix of the sequence based on the UCI payload information.

Example D5 may include the one or more NTCRM of any of examples D1-D4, wherein the PUCCH has a PUCCH format 1 and the sequence is a Zadoff-Chu sequence.

Example D6 may include the one or more NTCRM of example D1, wherein the sequence is initialized as a function of some or all of the UCI payload information.

Example D7 may include the one or more NTCRM of example D6, wherein the instructions, when executed, are further to cause the UE to determine an initialization value $c_{init}$ for the sequence according to:

$$c_{init}=n_{RNTI}\cdot2^{15}+n_{ID}+F(n);$$

wherein n corresponds to some or all of the UCI payload information, $n_{ID}$ is a scrambling ID, and $n_{RNTI}$ is a radio network temporary identifier (RNTI).

Example D8 may include the one or more NTCRM of example D7, wherein the UCI payload information corresponds to a value n, wherein N is a number of UCI bits, and wherein the sequence is determined based on a first scrambling ID when n<N/2 and based on a second scrambling ID when the n≥N/2.

Example D9 may include the one or more NTCRM of example D1 or D6-D8, wherein the instructions, when executed, are further to cause the UE to multiply encoded symbols of the PUCCH by the determined sequence.

Example D10 may include the one or more NTCRM of any of examples D6-D9, wherein the PUCCH has a PUCCH format 3.

Example E1 may include one or more non-transitory, computer-readable media (NTCRM) having instructions, stored thereon, that when executed by one or more processors cause a user equipment (UE) to: determine uplink control information (UCI) payload information for a physical uplink control channel (PUCCH) with a PUCCH format 1; determine a sequence for transmission of the PUCCH based on the UCI payload information; and map the determined sequence to allocated resources for the PUCCH format 1 for transmission.

Example E2 may include the one or more NTCRM of example E1, wherein the PUCCH is transmitted without a demodulation reference signal (DMRS).

Example E3 may include the one or more NTCRM of any of examples E1-E2, wherein the sequence is a Zadoff-Chu sequence.

Example E4 may include the one or more NTCRM of any of examples E1-E3, wherein the sequence is determined from a set of sequences that have at least one of different root indexes, different cyclic prefixes, or different orthogonal cover codes (OCCs).

Example E5 may include the one or more NTCRM of any of examples E1-E4, wherein to determine the sequence includes to determine a sequence group identity parameter of the sequence based on the UCI payload information.

Example E6 may include the one or more NTCRM of example E5, wherein the sequence group identity parameter u is determined according to one of:

$$u(n)=(f_{gh}+f_{ss}(n)) \bmod 30;$$

$$u(n)=(f_{gh}(n)+f_{ss}) \bmod 30;$$

$$u(n)=(f_{gh}(n)+f_{ss}(n)) \bmod 30; \text{ or}$$

$$u(n)=(f_{gh}+f_{ss}+n) \bmod 30;$$

wherein n corresponds to the UCI payload information, and $f_{gh}$ and $f_{ss}$ are group and sequence hopping functions.

Example E7 may include the one or more NTCRM of any of examples E1-E6, wherein to determine the sequence includes to determine a cyclic prefix of the sequence based on the UCI payload information.

Example E8 may include the one or more NTCRM of any of examples E1-E7, wherein the instructions, when executed, are further to cause the UE to apply respective time domain orthogonal cover code (OCCs) on odd and even UCI symbols of the PUCCH.

Example E9 may include an apparatus to be implemented in a user equipment (UE), the apparatus comprising: a radio frequency (RF) interface; and processor circuitry coupled to the RF interface, wherein the processor circuitry is to: determine uplink control information (UCI) payload information for a physical uplink control channel (PUCCH) with a PUCCH format 3; initialize a sequence based on some or all of the UCI payload information; and encode the PUCCH for transmission based on the initialized sequence.

Example E10 may include the apparatus of example E9, wherein the processor circuitry is to determine an initialization value $c_{init}$ for the sequence according to:

$$c_{init}=n_{RNTI} \cdot 2^{15}+n_{ID}+F(n);$$

wherein n corresponds to the some or all of the UCI payload information, $n_{ID}$ is a scrambling ID, and $n_{RNTI}$ is a radio network temporary identifier (RNTI).

Example E11 may include the apparatus of example E9, wherein the UCI payload information corresponds to a value n, and wherein the sequence is determined based on a first scrambling ID when n<N/2 and based on a second scrambling ID when the n≥N/2, wherein N is a number of UCI bits.

Example E12 may include the apparatus of any of examples E9-E11, wherein the processor circuitry is to multiply encoded symbols of the PUCCH by the determined sequence.

Example E13 may include one or more non-transitory, computer-readable media (NTCRM) having instructions, stored thereon, that when executed by one or more processors cause a user equipment (UE) to: determine one or more uplink control information (UCI) bits for a physical uplink control channel (PUCCH); and encode the PUCCH for transmission in a resource allocation for a PUCCH format 1, 3, or 4 without a demodulation reference signal (DMRS).

Example E14 may include the one or more NTCRM of example E13, wherein if the one or more UCI bits includes 1 bit then the PUCCH is encoded using binary phase shift keying (BPSK) and if the one or more UCI bits includes 2 bits then the PUCCH is encoded using quadrature phase shift keying (QPSK).

Example E15 may include the one or more NTCRM of example E14, wherein modulated symbols are multiplied with a length-12 sequence in frequency domain and with an orthogonal cover code (OCC), and then directly mapped to an allocated resource configured for PUCCH format 1.

Example E16 may include the one or more NTCRM of any of examples E13-E15, wherein the PUCCH has a PUCCH format 1, wherein the PUCCH is encoded using a sequence γ(n) assigned to original data symbols is $r_{u,v}^{(\alpha,\delta)}(n)$ multiplied by a complex valued symbol d(0) obtained from the one or more UCI bits, and a sequence γ(n) assigned to DMRS symbols $r_{u,v}^{(\alpha,\delta)}$ multiplied by a conjugated value of d(0).

Example E17 may include the one or more NTCRM of any of examples E13-E16, wherein to encode the PUCCH includes to apply respective time domain orthogonal cover code (OCCs) on odd and even UCI symbols.

Example E18 may include the one or more NTCRM of any of examples E13-E17, wherein to encode the PUCCH includes to generate an OCC based on discrete Fourier transform (DFT) orthogonal code to support a sequence length that is larger than 7 symbols.

Example E19 may include the one or more NTCRM of any of examples E13-E18, wherein the instructions, when executed, are further to cause the UE to: receive configuration information for a plurality of orthogonal sequences for PUCCH format 1; select a first sequence from the plurality of orthogonal sequences based on the one or more UCI bits, wherein the PUCCH is encoded based on the selected first sequence.

Example E20 may include the one or more NTCRM of example E19, wherein the configuration information includes a cyclic shift and an OCC index for each of the orthogonal sequences.

Example Z01 includes an apparatus comprising means to perform one or more elements of a method described in or related to any of examples A01-A21, B01-B27, C1-C29, D1-D10, E1-E20, or any other method or process described herein.

Example Z02 includes one or more non-transitory computer-readable media comprising instructions to cause an electronic device, upon execution of the instructions by one or more processors of the electronic device, to perform one or more elements of a method described in or related to any of examples A01-A21, B01-B27, C1-C29, D1-D10, E1-E20, or any other method or process described herein.

Example Z03 includes an apparatus comprising logic, modules, or circuitry to perform one or more elements of a method described in or related to any of examples A01-A21, B01-B27, C1-C29, D1-D10, E1-E20, or any other method or process described herein.

Example Z04 includes a method, technique, or process as described in or related to any of examples A01-A21, B01-B27, C1-C29, D1-D10, E1-E20, or portions or parts thereof.

Example Z05 includes an apparatus comprising: one or more processors and one or more computer-readable media comprising instructions that, when executed by the one or more processors, cause the one or more processors to perform the method, techniques, or process as described in or related to any of examples A01-A21, B01-B27, C1-C29, D1-D10, E1-E20, or portions thereof.

Example Z06 includes a signal as described in or related to any of examples A01-A21, B01-B27, C1-C29, D1-D10, E1-E20, or portions or parts thereof.

Example Z07 includes a datagram, packet, frame, segment, protocol data unit (PDU), or message as described in or related to any of examples A01-A21, B01-B27, C1-C29, D1-D10, E1-E20, or portions or parts thereof, or otherwise described in the present disclosure.

Example Z08 includes a signal encoded with data as described in or related to any of examples A01-A21, B01-B27, C1-C29, D1-D10, E1-E20, or portions or parts thereof, or otherwise described in the present disclosure.

Example Z09 includes a signal encoded with a datagram, packet, frame, segment, protocol data unit (PDU), or message as described in or related to any of examples A01-A21, B01-B27, C1-C29, D1-D10, E1-E20, or portions or parts thereof, or otherwise described in the present disclosure.

Example Z10 includes an electromagnetic signal carrying computer-readable instructions, wherein execution of the computer-readable instructions by one or more processors is to cause the one or more processors to perform the method, techniques, or process as described in or related to any of examples A01-A21, B01-B27, C1-C29, D1-D10, E1-E20, or portions thereof.

Example Z11 includes a computer program comprising instructions, wherein execution of the program by a processing element is to cause the processing element to carry out the method, techniques, or process as described in or related to any of examples A01-A21, B01-B27, C1-C29, D1-D10, E1-E20, or portions thereof.

Example Z12 includes a signal in a wireless network as shown and described herein.

Example Z13 includes a method of communicating in a wireless network as shown and described herein.

Example Z14 includes a system for providing wireless communication as shown and described herein.

Example Z15 includes a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |

| | |
|---|---|
| CE | Coverage Enhancement |
| CDM | Content Delivery Network |
| CDMA | Code-Division Multiple Access |
| CFRA | Contention Free Random Access |
| CG | Cell Group |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |

| | | |
|---|---|---|
| EN-DC | E-UTRA-NR Dual Connectivity | |
| EPC | Evolved Packet Core | |
| EPDCCH | enhanced PDCCH, enhanced Physical Downlink Control Cannel | |
| EPRE | Energy per resource element | |
| EPS | Evolved Packet System | |
| EREG | enhanced REG, enhanced resource element groups | |
| ETSI | European Telecommunications Standards Institute | |
| ETWS | Earthquake and Tsunami Warning System | |
| eUICC | embedded UICC, embedded Universal Integrated Circuit Card | |
| E-UTRA | Evolved UTRA | |
| E-UTRAN | Evolved UTRAN | |
| EV2X | Enhanced V2X | |
| F1AP | F1 Application Protocol | |
| F1-C | F1 Control plane interface | |
| F1-U | F1 User plane interface | |
| FACCH | Fast Associated Control CHannel | |
| FACCH/F | Fast Associated Control Channel/Full rate | |
| FACCH/H | Fast Associated Control Channel/Half rate | |
| FACH | Forward Access Channel | |
| FAUSCH | Fast Uplink Signalling Channel | |
| FB | Functional Block | |
| FBI | Feedback Information | |
| FCC | Federal Communications Commission | |
| FCCH | Frequency Correction CHannel | |
| FDD | Frequency Division Duplex | |
| FDM | Frequency Division Multiplex | |
| FDMA | Frequency Division Multiple Access | |
| FE | Front End | |
| FEC | Forward Error Correction | |
| FFS | For Further Study | |
| FFT | Fast Fourier Transformation | |
| feLAA | further enhanced Licensed Assisted Access, further enhanced LAA | |
| FN | Frame Number | |
| FPGA | Field-Programmable Gate Array | |
| FR | Frequency Range | |
| G-RNTI | GERAN Radio Network Temporary | |
| GERAN | GSM EDGE RAN, GSM EDGE Radio Access Network | |
| GGSN | Gateway GPRS Support Node | |
| GLONASS | GLObal'naya NAvigatsionnaya Sputnikovaya Sistema (Engl.: Global Navigation Satellite System) | |
| gNB | Next Generation NodeB | |
| gNB-CU | gNB-centralized unit, Next Generation NodeB centralized unit | |
| gNB-DU | gNB-distributed unit, Next Generation NodeB distributed unit | |
| GNSS | Global Navigation Satellite System | |
| GPRS | General Packet Radio Service | |
| GSM | Global System for Mobile Communications, Groupe Spécial Mobile | |
| GTP | GPRS Tunneling Protocol | |
| GTP-U | GPRS Tunnelling Protocol for User Plane | |
| GTS | Go To Sleep Signal (related to WUS) | |
| GUMMEI | Globally Unique MME Identifier | |
| GUTI | Globally Unique Temporary UE Identity | |
| HARQ | Hybrid ARQ, Hybrid Automatic Repeat Request | |
| HANDO | Handover | |
| HFN | HyperFrame Number | |
| HHO | Hard Handover | |
| HLR | Home Location Register | |
| HN | Home Network | |
| HO | Handover | |
| HPLMN | Home Public Land Mobile Network | |
| HSDPA | High Speed Downlink Packet Access | |
| HSN | Hopping Sequence Number | |
| HSPA | High Speed Packet Access | |
| HSS | Home Subscriber Server | |
| HSUPA | High Speed Uplink Packet Access | |
| HTTP | Hyper Text Transfer Protocol | |

| | | |
|---|---|---|
| HTTPS | Hyper Text Transfer Protocol Secure (https is http/1.1 over SSL, i.e. port 443) | |
| I-Block | Information Block | |
| ICCID | Integrated Circuit Card Identification | |
| IAB | Integrated Access and Backhaul | |
| ICIC | Inter-Cell Interference Coordination | |
| ID | Identity, identifier | |
| IDFT | Inverse Discrete Fourier Transform | |
| IE | Information element | |
| IBE | In-Band Emission | |
| IEEE | Institute of Electrical and Electronics Engineers | |
| IEI | Information Element Identifier | |
| IEIDL | Information Element Identifier Data Length | |
| IETF | Internet Engineering Task Force | |
| IF | Infrastructure | |
| IM | Interference Measurement, Intermodulation, IP Multimedia | |
| IMC | IMS Credentials | |
| IMEI | International Mobile Equipment Identity | |
| IMGI | International mobile group identity | |
| IMPI | IP Multimedia Private Identity | |
| IMPU | IP Multimedia PUblic identity | |
| IMS | IP Multimedia Subsystem | |
| IMSI | International Mobile Subscriber Identity | |
| IoT | Internet of Things | |
| IP | Internet Protocol | |
| Ipsec | IP Security, Internet Protocol Security | |
| IP-CAN | IP-Connectivity Access Network | |
| IP-M | IP Multicast | |
| IPv4 | Internet Protocol Version 4 | |
| IPv6 | Internet Protocol Version 6 | |
| IR | Infrared | |
| IS | In Sync | |
| IRP | Integration Reference Point | |
| ISDN | Integrated Services Digital Network | |
| ISIM | IM Services Identity Module | |
| ISO | International Organisation for Standardisation | |
| ISP | Internet Service Provider | |
| IWF | Interworking-Function | |
| I-WLAN | Interworking WLAN Constraint length of the convolutional code, USIM Individual key | |
| kB | Kilobyte (1000 bytes) | |
| kbps | kilo-bits per second | |
| Kc | Ciphering key | |
| Ki | Individual subscriber authentication key | |
| KPI | Key Performance Indicator | |
| KQI | Key Quality Indicator | |
| KSI | Key Set Identifier | |
| ksps | kilo-symbols per second | |
| KVM | Kernel Virtual Machine | |
| L1 | Layer 1 (physical layer) | |
| L1-RSRP | Layer 1 reference signal received power | |
| L2 | Layer 2 (data link layer) | |
| L3 | Layer 3 (network layer) | |
| LAA | Licensed Assisted Access | |
| LAN | Local Area Network | |
| LBT | Listen Before Talk | |
| LCM | LifeCycle Management | |
| LCR | Low Chip Rate | |
| LCS | Location Services | |
| LCID | Logical Channel ID | |
| LI | Layer Indicator | |
| LLC | Logical Link Control, Low Layer Compatibility | |
| LPLMN | Local PLMN | |
| LPP | LTE Positioning Protocol | |
| LSB | Least Significant Bit | |
| LTE | Long Term Evolution | |
| LWA | LTE-WLAN aggregation | |
| LWIP | LTE/WLAN Radio Level Integration with IPsec Tunnel | |
| LTE | Long Term Evolution | |
| M2M | Machine-to-Machine | |
| MAC | Medium Access Control (protocol layering context) MAC Message authentication code (security/encryption context) | |
| MAC-A | MAC used for authentication and key agreement (TSG T WG3 context) | |
| MAC-I | MAC used for data integrity of | |

| | | |
|---|---|---|
| MANO | Management and Orchestration | |
| MBMS | Multimedia Broadcast and Multicast Service | |
| MBSFN | Multimedia Broadcast multicast service Single Frequency Network | |
| MCC | Mobile Country Code | |
| MCG | Master Cell Group | |
| MCOT | Maximum Channel Occupancy Time | |
| MCS | Modulation and coding scheme | |
| MDAF | Management Data Analytics Function | |
| MDAS | Management Data Analytics Service | |
| MDT | Minimization of Drive Tests | |
| ME | Mobile Equipment | |
| MeNB | master eNB | |
| MER | Message Error Ratio | |
| MGL | Measurement Gap Length | |
| MGRP | Measurement Gap Repetition Period | |
| MIB | Master Information Block, Management Information Base | |
| MIMO | Multiple Input Multiple Output | |
| MLC | Mobile Location Centre | |
| MM | Mobility Management | |
| MME | Mobility Management Entity | |
| MN | Master Node | |
| MnS | Management Service | |
| MO | Measurement Object, Mobile Originated | |
| MPBCH | MTC Physical Broadcast CHannel | |
| MPDCCH | MTC Physical Downlink Control CHannel | |
| MPDSCH | MTC Physical Downlink Shared CHannel | |
| MPRACH | MTC Physical Random Access CHannel | |
| MPUSCH | MTC Physical Uplink Shared Channel | |
| MPLS | MultiProtocol Label Switching | |
| MS | Mobile Station | |
| MSB | Most Significant Bit | |
| MSC | Mobile Switching Centre | |
| MSI | Minimum System Information, MCH Scheduling Information | |
| MSID | Mobile Station Identifier | |
| MSIN | Mobile Station Identification Number | |
| MSISDN | Mobile Subscriber ISDN Number | |
| MT | Mobile Terminated, Mobile Termination | |
| MTC | Machine-Type Communications | |
| mMTC | massive MTC, massive Machine-Type Communications | |
| MU-MIMO | Multi User MIMO | |
| MWUS | MTC wake-up signal, MTC WUS | |
| NACK | Negative Acknowledgement | |
| NAI | Network Access Identifier | |
| NAS | Non-Access Stratum, Non-Access Stratum layer | |
| NCT | Network Connectivity Topology | |
| NC-JT | Non-Coherent Joint Transmission | |
| NEC | Network Capability Exposure | |
| NE-DC | NR-E-UTRA Dual Connectivity | |
| NEF | Network Exposure Function | |
| NF | Network Function | |
| NFP | Network Forwarding Path | |
| NFPD | Network Forwarding Path Descriptor | |
| NFV | Network Functions Virtualization | |
| NFVI | NFV Infrastructure | |
| NFVO | NFV Orchestrator | |
| NG | Next Generation, Next Gen | |
| NGEN-DC | NG-RAN E-UTRA-NR Dual Connectivity | |
| NM | Network Manager | |
| NMS | Network Management System | |
| N-PoP | Network Point of Presence | |
| NMIB, N-MIB | Narrowband MIB | |
| NPBCH | Narrowband Physical Broadcast CHannel | |
| NPDCCH | Narrowband Physical Downlink Control CHannel | |
| NPDSCH | Narrowband Physical Downlink Shared CHannel | |
| NPRACH | Narrowband Physical Random Access CHannel | |
| NPUSCH | Narrowband Physical Uplink Shared CHannel | |
| NPSS | Narrowband Primary | |

| | | |
|---|---|---|
| NSSS | Synchronization Signal Narrowband Secondary Synchronization Signal | |
| NR | New Radio, Neighbour Relation | |
| NRF | NF Repository Function | |
| NRS | Narrowband Reference Signal | |
| NS | Network Service | |
| NSA | Non-Standalone operation mode | |
| NSD | Network Service Descriptor | |
| NSR | Network Service Record | |
| NSSAI | Network Slice Selection Assistance Information | |
| S-NNSAI | Single-NSSAI | |
| NSSF | Network Slice Selection Function | |
| NW | Network | |
| NWUS | Narrowband wake-up signal, Narrowband WUS | |
| NZP | Non-Zero Power | |
| O&M | Operation and Maintenance | |
| ODU2 | Optical channel Data Unit-type 2 | |
| OFDM | Orthogonal Frequency Division Multiplexing | |
| OFDMA | Orthogonal Frequency Division Multiple Access | |
| OOB | Out-of-band | |
| OOS | Out of Sync | |
| OPEX | OPerating EXpense | |
| OSI | Other System Information | |
| OSS | Operations Support System | |
| OTA | over-the-air | |
| PAPR | Peak-to-Average Power Ratio | |
| PAR | Peak to Average Ratio | |
| PBCH | Physical Broadcast Channel | |
| PC | Power Control, Personal Computer | |
| PCC | Primary Component Carrier, Primary CC | |
| PCell | Primary Cell | |
| PCI | Physical Cell ID, Physical Cell Identity | |
| PCEF | Policy and Charging Enforcement Function | |
| PCF | Policy Control Function | |
| PCRF | Policy Control and Charging Rules Function | |
| PDCP | Packet Data Convergence Protocol, Packet Data Convergence Protocol layer | |
| PDCCH | Physical Downlink Control Channel | |
| PDCP | Packet Data Convergence Protocol | |
| PDN | Packet Data Network, Public Data Network | |
| PDSCH | Physical Downlink Shared Channel | |
| PDU | Protocol Data Unit | |
| PEI | Permanent Equipment Identifiers | |
| PFD | Packet Flow Description | |
| P-GW | PDN Gateway | |
| PHICH | Physical hybrid-ARQ indicator channel | |
| PHY | Physical layer | |
| PLMN | Public Land Mobile Network | |
| PIN | Personal Identification Number | |
| PM | Performance Measurement | |
| PMI | Precoding Matrix Indicator | |
| PNF | Physical Network Function | |
| PNFD | Physical Network Function Descriptor | |
| PNFR | Physical Network Function Record | |
| POC | PTT over Cellular | |
| PP, PTP | Point-to-Point | |
| PPP | Point-to-Point Protocol | |
| PRACH | Physical RACH | |
| PRB | Physical resource block | |
| PRG | Physical resource block group | |
| ProSe | Proximity Services, Proximity-Based Service | |
| PRS | Positioning Reference Signal | |
| PRR | Packet Reception Radio | |
| PS | Packet Services | |
| PSBCH | Physical Sidelink Broadcast Channel | |
| PSDCH | Physical Sidelink Downlink Channel | |
| PSCCH | Physical Sidelink Control Channel | |
| PSFCH | Physical Sidelink Feedback Channel | |
| PSSCH | Physical Sidelink Shared Channel | |
| PSCell | Primary SCell | |
| PSS | Primary Synchronization Signal | |
| PSTN | Public Switched Telephone Network | |
| PT-RS | Phase-tracking reference signal | |

-continued

| | |
|---|---|
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |

| | | |
|---|---|---|
| SDP | Session Description Protocol | |
| SDSF | Structured Data Storage Function | |
| SDU | Service Data Unit | |
| SEAF | Security Anchor Function | |
| SeNB | secondary eNB | |
| SEPP | Security Edge Protection Proxy | |
| SFI | Slot format indication | |
| SFTD | Space-Frequency Time Diversity, SFN and frame timing difference | |
| SFN | System Frame Number or Single Frequency Network | |
| SgNB | Secondary gNB | |
| SGSN | Serving GPRS Support Node | |
| S-GW | Serving Gateway | |
| SI | System Information | |
| SI-RNTI | System Information RNTI | |
| SIB | System Information Block | |
| SIM | Subscriber Identity Module | |
| SIP | Session Initiated Protocol | |
| SiP | System in Package | |
| SL | Sidelink | |
| SLA | Service Level Agreement | |
| SM | Session Management | |
| SMF | Session Management Function | |
| SMS | Short Message Service | |
| SMSF | SMS Function | |
| SMTC | SSB-based Measurement Timing Configuration | |
| SN | Secondary Node, Sequence Number | |
| SoC | System on Chip | |
| SON | Self-Organizing Network | |
| SpCell | Special Cell | |
| SP-CSI-RNTI | Semi-Persistent CSI RNTI | |
| SPS | Semi-Persistent Scheduling | |
| SQN | Sequence number | |
| SR | Scheduling Request | |
| SRB | Signalling Radio Bearer | |
| SRS | Sounding Reference Signal | |
| SS | Synchronization Signal | |
| SSB | SS Block | |
| SSBRI | SSB Resource Indicator | |
| SSC | Session and Service Continuity | |
| SS-RSRP | Synchronization Signal based Reference Signal Received Power | |
| SS-RSRQ | Synchronization Signal based Reference Signal Received Quality | |
| SS-SINR | Synchronization Signal based Signal to Noise and Interference Ratio | |
| SSS | Secondary Synchronization Signal | |
| SSSG | Search Space Set Group | |
| SSSIF | Search Space Set Indicator | |
| SST | Slice/Service Types | |
| SU-MIMO | Single User MIMO | |
| SUL | Supplementary Uplink | |
| TA | Timing Advance, Tracking Area | |
| TAC | Tracking Area Code | |
| TAG | Timing Advance Group | |
| TAU | Tracking Area Update | |
| TB | Transport Block | |
| TBS | Transport Block Size | |
| TBD | To Be Defined | |
| TCI | Transmission Configuration Indicator | |
| TCP | Transmission Communication Protocol | |
| TDD | Time Division Duplex | |
| TDM | Time Division Multiplexing | |
| TDMA | Time Division Multiple Access | |
| TE | Terminal Equipment | |
| TEID | Tunnel End Point Identifier | |
| TFT | Traffic Flow Template | |
| TMSI | Temporary Mobile Subscriber Identity | |
| TNL | Transport Network Layer | |
| TPC | Transmit Power Control | |
| TPMI | Transmitted Precoding Matrix Indicator | |
| TR | Technical Report | |
| TRP, TRxP | Transmission Reception Point | |
| TRS | Tracking Reference Signal | |
| TRx | Transceiver | |
| TS | Technical Specifications, Technical Standard | |
| TTI | Transmission Time Interval | |
| Tx | Transmission, Transmitting, Transmitter | |
| U-RNTI | UTRAN Radio Network Temporary Identity | |

| | |
|---|---|
| UART | Universal Asynchronous Receiver and Transmitter |
| UCI | Uplink Control Information |
| UE | User Equipment |
| UDM | Unified Data Management |
| UDP | User Datagram Protocol |
| UDR | Unified Data Repository |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/ or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. One or more non-transitory, computer-readable media (NTCRM) having instructions, stored thereon, that when executed by one or more processors cause a user equipment (UE) to:
   determine uplink control information (UCI) payload information for a physical uplink control channel (PUCCH) with a PUCCH format 1;
   determine a sequence for transmission of the PUCCH based on the UCI payload information, wherein to determine the sequence includes to determine a sequence group identity parameter of the sequence based on the UCI payload information, wherein the sequence group identity parameter u is determined according to one of:

$u(n)=(f_{gh}+f_{ss}(n))\bmod 30;$ $u(n)=(f_{gh}(n)+f_{ss})\bmod 30;$ $u(n)=(f_{gh}(n)+f_{ss}(n))\bmod 30;$ or $u(n)=(f_{gh}+f_{ss}+n)\bmod 30;$ wherein n corresponds to the UCI payload information, and $f_{gh}$ and $f_{ss}$ are group and sequence hopping functions; and
   map the determined sequence to allocated resources for the PUCCH format 1 for transmission.

2. The one or more NTCRM of claim 1, wherein the PUCCH is transmitted without a demodulation reference signal (DMRS).

3. The one or more NTCRM of claim 1, wherein the sequence is a Zadoff-Chu sequence.

4. The one or more NTCRM of claim 1, wherein the sequence is determined from a set of sequences that have at least one of different root indexes, different cyclic prefixes, or different orthogonal cover codes (OCCs).

5. The one or more NTCRM of claim 1, wherein to determine the sequence includes to determine a cyclic prefix of the sequence based on the UCI payload information.

6. The one or more NTCRM of claim 1, wherein the instructions, when executed, are further to cause the UE to apply respective time domain orthogonal cover code (OCCs) on odd and even UCI symbols of the PUCCH.

7. An apparatus to be implemented in a user equipment (UE), the apparatus comprising:
   a radio frequency (RF) interface; and
   processor circuitry coupled to the RF interface, wherein the processor circuitry is to:
   determine uplink control information (UCI) payload information for a physical uplink control channel (PUCCH) with a PUCCH format 3;
   initialize a sequence based on some or all of the UCI payload information, wherein the UCI payload information corresponds to a value n, and wherein the sequence is determined based on a first scrambling ID when n<N/2 and based on a second scrambling ID when the n≥N/2, wherein N is a number of UCI bits; and
   encode the PUCCH for transmission based on the initialized sequence.

8. The apparatus of claim 7, wherein the processor circuitry is to determine an initialization value $c_{init}$ for the sequence according to:

$c_{init}=n_{RNTI} \cdot 2^{15}+n_{ID}+F(n)$ wherein n corresponds to the some or all of the UCI payload information, nw is a scrambling ID, and $n_{RNTI}$ is a radio network temporary identifier (RNTI).

9. The apparatus of claim 7, wherein the processor circuitry is to multiply encoded symbols of the PUCCH by the determined sequence.

10. One or more non-transitory, computer-readable media (NTCRM) having instructions, stored thereon, that when executed by one or more processors cause a user equipment (UE) to:
    determine one or more uplink control information (UCI) bits for a physical uplink control channel (PUCCH) with a PUCCH format 1, 3, or 4;
    determine a value corresponding to the UCI payload information;
    select a first scrambling identifier when the value is less than a predetermined threshold, and select a second scrambling identifier when the value is greater than or equal to the predetermined threshold;
    determine a sequence based on the selected scrambling identifier; and
    encode the PUCCH for transmission based on the determined sequence, without a demodulation reference signal (DMRS).

11. The one or more NTCRM of claim 10, wherein if the one or more UCI bits includes 1 bit then the PUCCH is encoded using binary phase shift keying (BPSK) and if the one or more UCI bits includes 2 bits then the PUCCH is encoded using quadrature phase shift keying (QPSK).

12. The one or more NTCRM of claim 11, wherein modulated symbols are multiplied with a length-12 sequence in frequency domain and with an orthogonal cover code (OCC), and then directly mapped to an allocated resource configured for PUCCH format 1.

13. The one or more NTCRM of claim 10, wherein the PUCCH has a PUCCH format 1, wherein the PUCCH is encoded using a sequence γ(n) assigned to original data symbols is $r_{u,v}^{(\alpha,\delta)}(n)$ multiplied by a complex valued symbol d(0) obtained from the one or more UCI bits, and a sequence γ(n) assigned to DMRS symbols $r_{u,v}^{(\alpha,\delta)}$ multiplied by a conjugated value of d(0).

14. The one or more NTCRM of claim 10, wherein to encode the PUCCH includes to apply respective time domain orthogonal cover code (OCCs) on odd and even UCI symbols.

15. The one or more NTCRM of claim 10, wherein to encode the PUCCH includes to generate an OCC based on discrete Fourier transform (DFT) orthogonal code to support a sequence length that is larger than 7 symbols.

16. The one or more NTCRM of claim 10, wherein the instructions, when executed, are further to cause the UE to:
    receive configuration information for a plurality of orthogonal sequences for PUCCH format 1; and select a first sequence from the plurality of orthogonal sequences based on the one or more UCI bits, wherein the PUCCH is encoded based on the selected first sequence.

17. The one or more NTCRM of claim 16, wherein the configuration information includes a cyclic shift and an OCC index for each of the orthogonal sequences.

* * * * *